US012698831B2

(12) United States Patent
Cola et al.

(10) Patent No.: US 12,698,831 B2
(45) Date of Patent: Aug. 4, 2026

(54) STEPPED GASKETS FOR THERMAL INTERFACES AND METHODS OF MAKING AND USING THEREOF

(71) Applicant: Carbice Corporation, Atlanta, GA (US)

(72) Inventors: Baratunde Cola, Atlanta, GA (US); Craig Green, Atlanta, GA (US); Leonardo Prinzi, Atlanta, GA (US); Erik Anderson, Atlanta, GA (US)

(73) Assignee: Carbice Corporation, Atlanta, GA (US)

( * ) Notice: Subject to any disclaimer, the term of this patent is extended or adjusted under 35 U.S.C. 154(b) by 1089 days.

(21) Appl. No.: 17/492,349

(22) Filed: Oct. 1, 2021

(65) Prior Publication Data

US 2023/0106026 A1 Apr. 6, 2023

(51) Int. Cl.
| | |
|---|---|
| *F16J 15/10* | (2006.01) |
| *B64G 1/58* | (2006.01) |
| *B82Y 30/00* | (2011.01) |

(52) U.S. Cl.
CPC .............. *F16J 15/104* (2013.01); *B64G 1/58* (2013.01); *B82Y 30/00* (2013.01); *F16J 15/102* (2013.01)

(58) Field of Classification Search
CPC ...... F16J 15/104; F16J 15/102; F16J 15/0818; F16J 15/0825; F16J 15/0831; B64G 1/58; B82Y 30/00
See application file for complete search history.

(56) References Cited

U.S. PATENT DOCUMENTS

| | | | |
|---|---|---|---|
| 2,243,979 A | | 6/1941 | Reynolds |
| 4,535,996 A | * | 8/1985 | Cardis .................... F16J 15/127 |
| | | | 277/596 |
| 4,876,413 A | | 10/1989 | Vermilyea |
| 5,725,222 A | * | 3/1998 | Kobayashi ........... F16J 15/0818 |
| | | | 277/594 |
| 5,924,700 A | * | 7/1999 | Kobayashi ........... F16J 15/0818 |
| | | | 277/594 |
| 6,250,127 B1 | | 6/2001 | Polese |
| 6,921,462 B2 | | 7/2005 | Montgomery |
| 6,965,513 B2 | | 11/2005 | Montgomery |
| 7,086,451 B2 | | 8/2006 | Leu |
| 7,465,605 B2 | | 12/2008 | Raravikar |
| 7,993,620 B2 | | 8/2011 | Lashmore |
| 8,093,715 B2 | | 1/2012 | Xu |
| 8,128,098 B2 | | 3/2012 | Plunkett |
| 8,220,530 B2 | | 7/2012 | Cola |
| 10,561,040 B1 | | 2/2020 | Lunsman et al. |

(Continued)

FOREIGN PATENT DOCUMENTS

| | | |
|---|---|---|
| EP | 2251302 | 11/2010 |
| JP | 2013115094 | 6/2013 |
| WO | 2013/007645 | 1/2013 |

OTHER PUBLICATIONS

Bayer, et al., Support-Catalyst-Gas interactions during carbon nanotube growth on metallic ta films, *J Phys. Chem.*, 115:4359-69 (2011).

(Continued)

*Primary Examiner* — Gilbert Y Lee
(74) *Attorney, Agent, or Firm* — Pabst Patent Group LLP

(57) ABSTRACT

Thermal interfaces or joints including stepped gaskets and/or shims therein and their methods of making and using are described herein.

44 Claims, 8 Drawing Sheets

(56) References Cited

U.S. PATENT DOCUMENTS

| | | | |
|---|---|---|---|
| 2002/0140336 A1 | 10/2002 | Stoner | |
| 2004/0065717 A1 | 4/2004 | Saijo | |
| 2004/0075224 A1* | 4/2004 | Kuroki | F16J 15/123 |
| | | | 277/650 |
| 2004/0105807 A1 | 6/2004 | Fan | |
| 2004/0184981 A1 | 9/2004 | Liu | |
| 2004/0261987 A1 | 12/2004 | Zhang | |
| 2005/0214197 A1 | 9/2005 | Gu | |
| 2005/0228097 A1 | 10/2005 | Zhong | |
| 2006/0061045 A1* | 3/2006 | Burg | F16J 15/0818 |
| | | | 277/593 |
| 2006/0073089 A1 | 4/2006 | Ajayan | |
| 2006/0231970 A1 | 10/2006 | Hua | |
| 2006/0251897 A1 | 11/2006 | Pan | |
| 2007/0253889 A1 | 11/2007 | Awano | |
| 2008/0095695 A1 | 4/2008 | Shanov | |
| 2008/0149166 A1 | 6/2008 | Beeson | |
| 2008/0160866 A1 | 7/2008 | Zhang | |
| 2008/0236804 A1 | 10/2008 | Cola | |
| 2008/0241755 A1 | 10/2008 | Franklin | |
| 2008/0292840 A1 | 11/2008 | Majumdar | |
| 2009/0032496 A1 | 2/2009 | Yuan | |
| 2009/0130370 A1 | 5/2009 | Sansom | |
| 2009/0181239 A1 | 7/2009 | Fan | |
| 2009/0246507 A1 | 10/2009 | Graham | |
| 2009/0273143 A1* | 11/2009 | Nagawa | F16J 15/0818 |
| | | | 277/608 |
| 2009/0311166 A1 | 12/2009 | Hart | |
| 2009/0325063 A1 | 12/2009 | Albano | |
| 2010/0027221 A1 | 2/2010 | Iwai | |
| 2010/0187771 A1* | 7/2010 | Waltenberg | F01N 13/1827 |
| | | | 277/596 |
| 2011/0007477 A1 | 1/2011 | Xu | |
| 2011/0020593 A1 | 1/2011 | Winkler | |
| 2011/0038077 A1* | 2/2011 | Uranaka | F16J 15/104 |
| 2011/0086464 A1 | 4/2011 | Kim | |
| 2012/0128880 A1 | 5/2012 | Talapatra | |
| 2012/0321961 A1 | 12/2012 | Yushin | |
| 2013/0234313 A1 | 9/2013 | Wainerdi | |
| 2013/0294999 A1 | 11/2013 | Liu | |
| 2014/0015158 A1 | 1/2014 | Cola | |
| 2014/0099493 A1 | 4/2014 | Liu | |
| 2014/0140008 A1 | 5/2014 | Yamaguchi | |
| 2014/0197605 A1* | 7/2014 | Shimazoe | F16J 15/123 |
| | | | 277/641 |
| 2014/0224466 A1 | 8/2014 | Lin | |
| 2015/0360418 A1 | 12/2015 | Shah | |
| 2015/0360948 A1 | 12/2015 | Wei | |
| 2016/0088720 A1 | 3/2016 | Willis | |
| 2016/0104655 A1 | 4/2016 | Kawabata | |
| 2016/0260687 A1 | 9/2016 | Gao | |
| 2017/0009918 A1 | 1/2017 | Koves | |
| 2017/0108462 A1 | 4/2017 | Chen | |
| 2017/0120220 A1 | 5/2017 | Watanabe | |
| 2017/0129220 A1 | 5/2017 | Taka | |
| 2017/0198551 A1 | 7/2017 | Zhou | |
| 2017/0342550 A1 | 11/2017 | Siegal | |
| 2017/0347492 A1 | 11/2017 | Cola | |
| 2018/0108594 A1 | 4/2018 | Kondo | |
| 2018/0187020 A1 | 7/2018 | Arl | |
| 2018/0218841 A1 | 8/2018 | Cattien | |
| 2018/0218847 A1 | 8/2018 | Nguyen | |
| 2018/0254236 A1 | 9/2018 | Cola | |
| 2018/0318467 A1 | 11/2018 | Esplin | |
| 2019/0002284 A1 | 1/2019 | Inoue | |
| 2019/0036186 A1 | 1/2019 | Kim | |
| 2019/0057926 A1 | 2/2019 | Hirose | |
| 2019/0077666 A1 | 3/2019 | Wang | |
| 2019/0115278 A1 | 4/2019 | Greenhill | |
| 2019/0271397 A1* | 9/2019 | Heuschmid | F16J 15/0881 |
| 2019/0311970 A1 | 10/2019 | Minami | |
| 2019/0323785 A1 | 10/2019 | Eid | |

OTHER PUBLICATIONS

Cola, et al., "Contact mechanics and thermal conductance of carbon nanotube array interfaces", *Int. J. Heat Mass Trans.*, 52:3490-3503 (2009).

Dai, et al., "Controlled growth and modification of vertically-aligned carbon nanotubes for multifunctional applications", *Mater. Sci. Eng.*, 70:63-91 (2010).

Hildreth, et al., "Conformally coating vertically aligned carbon nanotube arrays using thermal decomposition of iron pentacarbonyl", *J Vac Sci Technol. B*, 30(3):03D1011-03D1013 (2012).

Kim, et al., "Evolution in catalyst morphology leads to carbon nanotube growth termination", *J Phys. Chem. Lett*, 1:918-22 (2010).

Kim, et al., "Evolution in catalyst morphology leads to carbon nanotube growth termination", J Phys. Chem. Lett, 1:918-22 (2010).

International Search Report received for PCT/US2022/077361, mailed on Jan. 25, 2023, 4 pages.

* cited by examiner

STEPPED GASKETS FOR THERMAL INTERFACES AND METHODS OF MAKING AND USING THEREOF

FIELD OF THE INVENTION

This invention is in the field of thermal interfaces and gasket materials, as well as methods of making and using thereof.

BACKGROUND OF THE INVENTION

It is known that thermal interfaces or joints formed of at least two plates which are fastened, such as by bolts, and a compressible material, such as a gasket, in between the plates. At least one of the plates is subject to unwanted plate deformation or curvature. The inclusion of a gasket material between two bolted plates can lead to even further deformation or curvature, where thinner gaskets can limit but not eliminate the extent of plate deformation or curvature. The plate deformation or curvature causes formation of gap(s) which decrease and/or limit the contact area between the plates and gasket and negatively impacts the ability of thermal interface to conduct heat efficiently. Increasing gasket thickness uniformly can increase contact area, but thicker gaskets can result in greater plate deformation or curvature. Because plate deformation or curvature increases with maximum deflection (near the fastening (bolt) locations), increasing thickness of the gasket increases curvature, thereby making it difficult to make center contact consistently without resorting to extremely thick gaskets.

Accordingly, a key challenge is to address the shortcomings of known thermal interfaces or joints due to the limitations caused by the plate deformation.

Thus, there is a need for addressing the formation of gap(s) caused by plate deformation in fastened thermal interfaces or joints.

Therefore, it is an object of the invention to provide thermal interfaces or joints with increased contact regions/areas which at least minimize the negative effects caused by plate deformation.

It is also an object of the invention to provide means of making and using such thermal interfaces or joints.

SUMMARY OF THE INVENTION

Thermal interfaces or joints and methods of making thereof are described herein. Such a thermal interface or joint can include:

first and second plates;

a stepped gasket in between the first and second plates; and one or more fasteners joining the first and the second plates;

wherein at least one of the first and/or the second plates exhibits plate deformation, deflection, or curvature;

wherein the stepped gasket comprises a plurality of layers and there is at least a first base layer and at least a second layer, on top of and in contact with the first base layer, which has a surface area smaller than the surface area of the first base layer; and wherein the at least second layer of the stepped gasket provides at least one or more contact regions with the at least one of the first and/or the second plates exhibiting plate deformation, deflection, or curvature, as compared to a single layer gasket that is not stepped.

The thermal interface or joint includes two plates, a base plate (bottom plate) and a top plate, which typically exhibits deformation, deflection, or curvature, either when the two plates are fastened (e.g., bolted) or during manufacture of the plates. The top and bottom plates can be made of any suitable material, having any suitable shape and dimensions, and thickness for use as a thermal interface. The two plates are usually made of the same material, have the same shape and dimensions, and optionally the same thickness.

The top and bottom plates of the thermal interface or joint are fastened by one or more fasteners where the one or more fasteners join the first and the second plates through one or more holes present on the top and the bottom plates. There may be any number of the one or more fastener holes present on both plates in the same positions on each plate, as may be needed to allow for fasteners to join the two plates. The one or more fasteners can be used to fasten the first (base or bottom) plate and second (top) plates through each of the fastener holes which may be present. The one or more fasteners can be selected from threaded fasteners, clamps, clips, push pins, rivets, a pneumatic press, a hydraulic press, or combinations thereof.

In some instances, for the thermal interfaces and joints described the at least one or more additional contact regions provided by use of a stepped gasket provides an increase in temperature uniformity of the first and/or second plates exhibiting plate deformation, deflection, or curvature thereby providing an average thermal conductance across the thermal interface at least 25% higher, 30% higher, 40% higher, or 50% higher than that of the same thermal interface with a single layer gasket that is not stepped therein. The thermal conductance is defined as the time rate of steady state heat flow through a unit area of the thermal interface or joint induced by a unit temperature difference between the thermal interface surfaces.

In certain instances, for the thermal interfaces and joints described the at least one or more additional contact regions provided by use of a stepped gasket provides an increase in contact area between the stepped gasket and the at least one of the first and/or the second plates exhibiting plate deformation, deflection, or curvature thereby providing an average thermal conductance across the thermal interface at least 25% higher, 30% higher, 40% higher, or 50% higher than that of the same thermal interface with a single layer gasket that is not stepped therein. The thermal conductance is defined as the time rate of steady state heat flow through a unit area of the thermal interface or joint induced by a unit temperature difference between the thermal interface surfaces.

The use of stepped gaskets introduces one or more contact regions or areas between the stepped gasket and the plate exhibiting deformation or curvature, as compared to use of a single layer gasket. Stepped gaskets can be designed to match or modify (improve) the thermal profile of the plates. Stepped gaskets can distribute contact loads more evenly for better overall uniformity. The number of layers of a stepped gasket and relative location of layers present in a stepped gasket can be positioned based on interface curvature modeling to properly position or produce a desired number of contact points or regions which improve the thermal performance of the thermal interface or joint.

The use of stepped gaskets provides at least one or more contact regions with the at least one of the first and/or the second plates exhibiting plate deformation, deflection, or curvature, as compared to use of a single layer gasket that is not stepped. For a given stepped gasket each layer included may provide at least one, two, three, or four independent contact regions to the at least one of the first and/or the second plates exhibiting plate deformation, deflection, or curvature, as compared to a gasket without that layer. In some instances, the one or more contact regions resulting from use of a stepped gaskets can be said to contact at least about 5%, 10%, 20%, 30%, 40%, 50%, 60%, 70%, 80%, or 90% of the surface of the at least one of the first and/or the second plates exhibiting plate deformation, deflection, or curvature. In some instances, the one or more contact regions resulting from use of a stepped gaskets can be said to contact at least about 5% to 25%, about 5% to 50%, about 5% to 75%, or about 5% to 90%, and sub-ranges within, of the surface of the at least one of the first and/or the second plates exhibiting plate deformation, deflection, or curvature. The formation of one or more contact regions and resulting increase in contact area between the gasket and plates provides an increase in the overall thermal conductivity of the thermal interface or joint.

In some instances, each of the plurality of layers of the stepped gasket is independently made of a material selected from graphite, carbon fiber, silicone, thermoplastic elastomers, rubber, and acrylic.

In some instances, stepped gasket can be made of multi-layered or multitiered structures containing carbon nanotube arrays or sheets. For example, the stepped gasket can be a multilayered or multitiered structure. Such stepped gaskets are described in detail below.

The thermal interfaces and joints described above may also include one or more shims thereon. The one or more shims can be placed or located around, close to, and/or behind the one or more fasteners or fastener holes present on the plate(s). In some instances, the one or more shims have a height which is selected to be equal to the height of the first layer of stepped gasket. In some instances, the one or more shims are positioned as far behind the fastener holes and fasteners as possible, such as on the very edge of the plates. In some instances, the shims are made of a metal foil, preferably an aluminum or copper foil. In some other instances, the shims are made of a material selected from graphite, carbon fiber, silicone, thermoplastic elastomers, rubber, and acrylic. In still other instances, the shims are made of a multilayered or multitiered structure.

Thermal interfaces or joints having stepped gaskets therein can be prepared according to a method including the steps of:
(1) providing first and second plates;
(2) providing a stepped gasket;
(3) placing the stepped gasket in between the first and the second plates;
(4) joining the first and the second plates with one or more fasteners;
wherein at least one of the first and/or the second plates exhibits plate deformation, deflection, or curvature when joined by the one or more fasteners;
wherein the stepped gasket comprises a plurality of layers and there is at least a first base layer and at least a second layer, on top of and in contact with the first base layer, which has a surface area smaller than the surface area of the first base layer; and
wherein the at least second layer of the stepped gasket provides at least one or more contact regions with the at least one of the first and/or the second plates exhibiting plate deformation, deflection, or curvature, as compared to a single layer gasket that is not stepped.

In some other instances, it is possible to counteract the effects of plate deformation, deflection, or curvature by including one or more shims in a thermal interface or joint having a single layer gasket therein. For example, a thermal interface or joint can include:
first and second plates;
a single layer gasket in between the first and second plates; and
one or more fasteners joining the first and the second plates;
wherein at least one of the first and/or the second plates exhibits plate deformation, deflection, or curvature;
wherein one or more shims are present around, close to, and/or behind the one or more fasteners to reduce and/or mitigate the deformation, deflection, or curvature of the first and/or the second plates.

Such thermal interfaces or joints having shims with a single layer gasket therein can be prepared according to a method including the steps of:
(1) providing first and second plates;
(2) providing a single layer gasket;
(3) placing the single layer gasket in between the first and the second plates;
(4) placing one or more shims in between the first and the second plates;
(5) joining the first and the second plates with one or more fasteners; wherein at least one of the first and/or the second plates exhibits plate deformation, deflection, or curvature when joined by the one or more fasteners;
wherein one or more shims are present around, close to, and/or behind the one or more fasteners to reduce and/or mitigate the deformation, deflection, or curvature of the first and/or the second plates.

The thermal interfaces or joints described above can form part of a device. Such devices, include without limitation, personal computers, server computers, memory modules, graphics chips, radar and radio-frequency (RF) devices, disc drives, displays, including light-emitting diode (LED) displays, lighting systems, automotive control units, power-electronics, solar cells, batteries, communications equipment, such as cellular phones, thermoelectric generators, and imaging equipment, including MRIs.

In certain instances, the thermal interfaces or joints described throughout the specification are useful in low contact pressure and/or low pressure applications. Low pressure may refer to ambient pressure or pressures below 1 atm, such as in the range of about 0.01 to less than about 1 atm. In some instances, low pressure may refer to a vacuum, such as in aerospace applications, where such thermal interfaces or joints could be used in satellites or space vehicles/systems. Under vacuum conditions the thermal interfaces or joints are especially useful because unlike in atmospheric pressure applications where air in the separation gap between plates can contribute to heat transfer, the additional contact points enabled by the stepped gasket can substantially enhance area participating in heat transfer across the joint. Furthermore, the use of thick gaskets to make up contact in space applications can be problematic as the plate deformation that goes along with thick gaskets can result in stresses on potted inserts that can result in the inserts pulling out during the life of the spacecraft. In certain instances, the thermal interfaces or joints described are useful at temperatures which are below ambient temperature, below freezing, or at cryogenic temperatures (such as experienced in space).

DETAILED DESCRIPTION OF THE INVENTION

I. Definitions

Figure 1A:
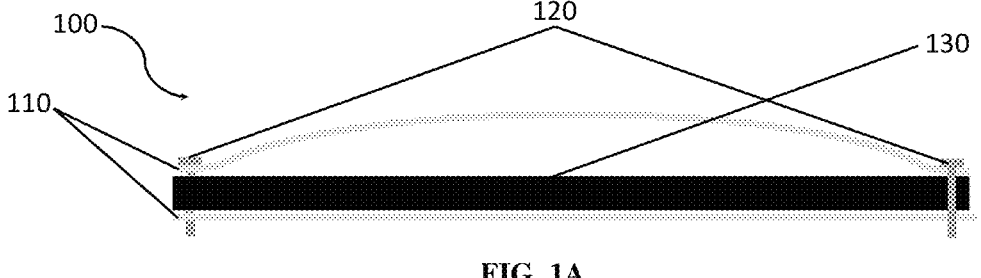
FIG. 1A is a non-limiting cross-sectional representational view of a thermal interface 100 having two plates 110 (top plate exhibiting plate deformation, deflection, or curvature), two fasteners 120 (i.e., bolts), and a thin single layer gasket 130 in between the plates.

"Compliant" or "Compliance," as used herein, refers to the ability of a material to conform when contacted to one or more surfaces such that efficient conformance to the asperities of the adjoining surface results in sufficient or high contact areas at the interfaces between the surfaces and the material.

"Interdigitation" or "Interdigitating", as used herein, refers to the ability and or degree which one or more individual nanostructure elements of an array or sheet to infiltrate or penetrate into the adjacent nanostructure elements of another array or sheet when the two different arrays or sheets are contacted or stacked.

"Carbon Nanotube Array" or "CNT array" or "CNT forest", as used herein, refers to a plurality of carbon nanotubes which are vertically aligned on a surface of a material. Carbon nanotubes are said to be "vertically aligned" when they are substantially perpendicular to the surface on which they are supported or attached. Nanotubes are said to be substantially perpendicular when they are oriented on average within 30, 25, 20, 15, 10, or 5 degrees of the surface normal.

"Carbon Nanotube Sheet" or "CNT sheet", as used herein, refers to a plurality of carbon nanotubes which are aligned in plane to create a free-standing sheet. Carbon nanotubes are said to be "aligned in plane" when they are substantially parallel to the surface of the sheet that they form. Nanotubes are said to be substantially parallel when they are oriented on average greater than 40, 50, 60, 70, 80, or 85 degrees from sheet surface normal.

"Coating material" as used herein, generally refers to polymers and/or molecules that can bond to CNTs through van der Waals bonds, π-π stacking, mechanical wrapping and/or covalent bonds and bond to metal, metal oxide, or semiconductor material surfaces through van der Waals bonds, π-π stacking, and/or covalent bonds.

"Elastic recovery" as used herein, refers to the ability of a material to return to its original shape following compression, expansion, stretching, or other deformation.

"Compression set" as used herein, refers to the permanent deformation of a material which remains when a force, such as compression, was applied to the material and the force was subsequently removed.

"Plate deformation, deflection, or curvature," as used herein refers to any deformation, deflection, or curvature of a plate, as compared to its planar state, resulting from reactionary "normal" forces when a base plate of a thermal interface or joint and a compressible material, such as a gasket, produce a lever effect on a top plate, when the two plates are fastened (i.e., bolted) causing bending upwards around the fastener force(s). In some cases, deformation, deflection, or curvature of a plate may also arise during fabrication of the plate(s) from processes such as milling, casting, rolling or bonding.

"Fastener Spacing" or "Bolt Spacing," as used herein, refer to the distance between fasteners, such as bolts, which can include fasteners immediately next to each other or directly across from each other (on opposite edges of a plate).

"Shims" as used herein, refer to pieces of a material which can be placed around, close to (i.e., on the edge of), and/or behind, for example, the plurality of fastener holes on plates, such that they create a height or thickness mismatch between the shims and the surrounding area of an interface. The shims can produce a reactionary force behind the fasteners (i.e., bolts) which counteract the reactionary force of a gasket and plates, when fastened (i.e., bolted), which cause an initial deformation. The shims can increase the contacting area and push it further into the plate and away from the position of the fasteners.

Numerical ranges disclosed in the present application include, but are not limited to, ranges of temperatures, ranges of pressures, ranges of integers, ranges of conductance and resistance values, ranges of times, and ranges of thicknesses. The disclosed ranges of any type, disclose individually each possible number that such a range could reasonably encompass, as well as any sub-ranges and combinations of sub-ranges encompassed therein. For example, disclosure of a pressure range is intended to disclose individually every possible temperature value that such a range could encompass, consistent with the disclosure herein.

II. Thermal Interfaces or Joints with Stepped Gaskets

Thermal interfaces or joints formed of at least two plates, which are fastened, such as by nuts and bolts, and a compressible material, such as a gasket, in between the plates. It is known that at least one of the plates is subject to undesirable plate deformation, deflection, or curvature.

Figure 1B:
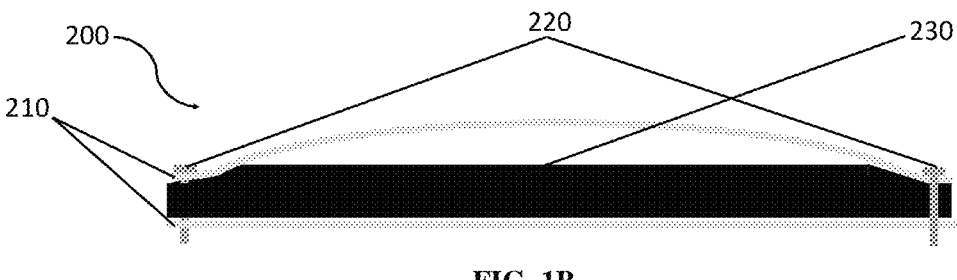
FIG. 1B is a non-limiting cross-sectional representational view of a thermal interface 200 having two plates 210 (top plate exhibiting plate deformation, deflection, or curvature), two fasteners 220 (i.e., bolts), and a thick single layer gasket 230 in between the plates.

The inclusion of a gasket material between two bolted plates can in some instances lead to even further plate deformation, deflection, or curvature Thinner gaskets can limit but not eliminate the extent of plate deformation, deflection, or curvature. As an example, FIG. 1A shows a cross-sectional representational view of a thermal interface 100 having two plates 110, two fasteners 120 (i.e., bolts), and a thin single layer gasket 130 in between the plates where the top most plate exhibits plate deformation, deflection, or curvature. However, because the plate deformation, deflection, or curvature causes the plates to separate from the gasket, decreasing and/or negatively affecting the contact-dependent heat conducting ability of the thermal interface. Thus, in order to counteract the negative thermal penalty of plate deformation, deflection, or curvature one can increase gasket thickness uniformly to better conform to the plate deformation, deflection, or curvature and thereby provide an increase in the contact area. Thicker gaskets, however, can result in greater plate deformation, deflection, or curvature. For example, FIG. 1B shows a cross-sectional representational view of a thermal interface 200 having two plates 210, two fasteners 220 (i.e., bolts), and a thick single layer gasket 230 in between the plates where the top most plate exhibits plate deformation, deflection, or curvature.

Plate deformation, deflection, or curvature increases and exhibits a maximum deflection at or near the fastener (i.e., bolt) locations. Plate deformation, deflection, or curvature can also be said to be at a maximum at or near the midpoint between opposing bolts. Thus, merely increasing thickness of the gasket will increase curvature and makes it difficult to make center contact consistently without resorting to extremely thick gaskets, which is not desirable or practical as a solution.

In thermal interfaces or joints, plate contact area with a gasket is proportional to plate thickness, plate elastic modulus, and fastener (i.e., bolt) torque. Plate contact area is inversely proportional to the distance between fasteners (i.e., bolts). In thermal interfaces or joints, plate deformation, deflection, or curvature is inversely proportional to plate thickness and plate elastic modulus. Plate deformation, deflection, or curvature is proportional to fastener (i.e., bolt) torque and monotonically increases with the distance between fasteners (i.e., bolts). In some instances, it is possible to model parameters, such the deflection, contact area, pressure, and thermal conductance for theoretical thermal interfaces. This enables selection of properties of the stepped gaskets discussed below to maximize properties of the thermal interface or joint, such as by increasing the contact regions/area between the stepped gasket and the plates and the thermal conductance overall.

In order to address the issues resulting from plate deformation, deflection, or curvature, as discussed above, a thermal interface or joint includes:

first and second plates;

a stepped gasket in between the first and second plates; and one or more fasteners joining the first and the second plates;

wherein at least one of the first and/or the second plates exhibits plate deformation, deflection, or curvature;

wherein the stepped gasket comprises a plurality of layers and there is at least a first base layer and at least a second layer, on top of and in contact with the first base layer, which has a surface area smaller than the surface area of the first base layer; and wherein the at least second layer of the stepped gasket provides at least one or more contact regions with the at least one of the first and/or the second plates exhibiting plate deformation, deflection, or curvature, as compared to a single layer gasket that is not stepped.

Figure 2:
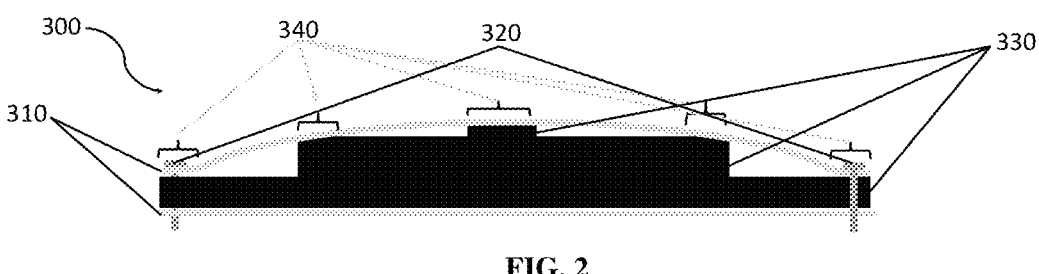
FIG. 2 is a non-limiting cross-sectional representational view of a thermal interface 300 having two plates 310 (top plate exhibiting plate deformation, deflection, or curvature), two fasteners 320 (i.e., bolts), a stepped gasket 330 (having three steps) in between the plates which provide a plurality of contact regions 340 between the stepped gasket to the top plate exhibiting plate deformation, deflection, or curvature.

As shown in FIG. 2, a cross-sectional representational view of a thermal interface 300 having two plates 310 (top plate exhibiting plate deformation, deflection, or curvature), two fasteners 320 (i.e., bolts), a stepped gasket 330 (having three steps) in between the plates provides a plurality of contact regions 340 between the stepped gasket and the top most plate exhibiting plate deformation, deflection, or curvature. The introduction of contact regions by use of a stepped gasket (versus a single layer gasket) counteracts the deleterious effect of the gap formed by plate deformation, deflection, or curvature.

Figure 3A:
FIG. 3A is a non-limiting cross-sectional representational view of a stepped gasket having a first base layer 410 and a second layer 420 on the first base layer.
Figure 3B:
FIG. 3B is a non-limiting cross-sectional representational view of a stepped gasket having a first base layer 510, a second layer 520 on the first base layer, and a third layer 530 on the second layer.
Figure 4:
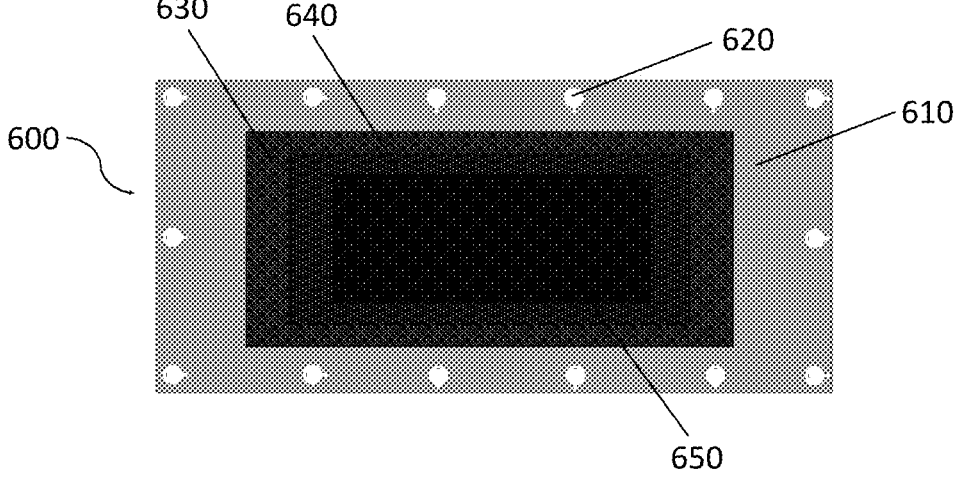
FIG. 4 is a non-limiting top down representational view of a plate and gasket 600 having a bottom plate 610 with a plurality of fastener holes 620 and a stepped gasket having a first base layer 630, a second layer 640 on the first base layer, and a third layer 650 on the second layer.

A stepped gasket has at least two layers, as shown in FIG. 3A showing a cross-sectional representational view of a stepped gasket having a first base layer 410 and a second layer 420 on the first base layer. In some other instances, the stepped gasket has at least three layers, as shown in FIG. 3B showing a cross-sectional representational view of a stepped gasket having a first base layer 510, a second layer 520 on the first base layer, and a third layer 530 on the second layer. FIG. 4 shows an exemplary three layer gasket on a base plate. Stepped gaskets with additional layers up to 4 or 5 layers in total are also envisioned.

It is believed that each additional layer provides additional contact regions with the at least one of the first and/or the second plates exhibiting plate deformation, deflection, or curvature. Further, each layer is smaller than the layer below and has a surface area which is smaller than the surface area of the layer below.

The thermal interface or joint includes two plates, a base plate (bottom plate) and a top plate, which typically exhibits deformation, deflection, or curvature, either when the two plates are fastened (e.g., bolted) or during manufacture of the plates. Either the top or base (bottom) plate is planar or substantially planar (where "substantially planar" means less than 0.25 μm of out of flatness per mm of plate length). The top and bottom plates, such as shown in FIG. 2, can be made of any suitable material, having any suitable shape and dimensions, and thickness for use as a thermal interface. The two plates are usually made of the same material, have the same shape and dimensions, and optionally the same thickness. In some instances, the first (bottom or base) and second (top) plates have a square, rectangular, circular, oval, or ring shape. Typically, the stepped gasket has the same overall shape, for at least the first base layer, as the first and second plates. In some instances, plates having a thickness of about >4 mm can be considered as highly rigid plates, whereas plates having a thickness of about <4 mm can be considered as moderately or lowly rigid plates. In some instances, the plates independently have a thickness ranging from about 0.5 to about 30 mm, about 0.5 to about 20 mm, or about 0.5 to about 10 mm, and sub-ranges within. In certain instances, both plates are ¼" thick plates.

In some instances, the first (bottom or base) and second (top) plates can be independently made of a material selected from aluminum, copper, steel, titanium, zinc, metal matrix composites (such as AlSiC or aluminum-graphite), and metal laminate structures (such as honeycomb panels or fiber metal laminates). In some instances, the first (bottom or base) and second (top) plates can be independently made of a plastic selected from acrylonitrile butadiene styrene, polycarbonate, nylon, epoxy, glass-reinforced epoxy laminate material (such as FR4), high-pressure fiberglass laminate (such as G10), fiberglass composites, PEEK, polyethylene, polyethylene terephthalate glycol, polypropylene, polyurethane, polyvinyl chloride, polyimide, polytetrafluoroethylene, polylactic acid, PEDOT:PSS (poly(3,4-ethylenedioxythiophene) polystyrene sulfonate), PARA, polyphenylene sulfide, polyamide-imide, and polyetherimide. In still other instances, the first (bottom or base) and second (top) plates can be independently made of a ceramic selected from alumina, aluminum nitride, zirconia, zirconia alumina, beryllium oxide, carbon fiber, graphite, silicon carbide, silicon dioxide, silicon nitride, $Y_2O_3$, TiC, $SrAl_2O_3$, ZrC, HfC, TaC, $ZrB_2$, $HfB_2$, $Mo_2B_5$, $MoSi_2$ TiN, YrN, co-fired ceramics (including high temperature co-fired ceramics (HTCC), low temperature co-fired ceramics (LTCC), ultra low temperature co-fired ceramics (ULTCC), including those consisting of phosphates, silicates, borates, molybdates, vanadates, tellurates and tungstates).

The top and bottom plates of the thermal interface or joint are fastened by one or more fasteners where the one or more fasteners join the first and the second plates through one or more holes present on the top and the bottom plates. There may be any number of the one or more fastener holes present on both plates in the same positions on each plate, as may be needed to allow for fasteners to join the two plates. In some instances, there are at least 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, or 32 fastener holes on each plate. The fastener holes present can have any shape or size as needed. In some instances, the fastener holes are circular and can have a diameter which is suitable to a fastener, such as a bolt. In some instances, the fastener holes may be threaded to receive a threaded fastener. The fastener holes may be spaced in any relative arrangement which is suitable. However, it is preferred in certain instances for the fastener holes to present at one or more edges of the plates. Typically, the fastener holes are evenly spaced on the plates. A non-limiting example of fastener holes on a plate and their relative positions to each other is shown in FIG. 4. In some instances, spacing between fastener holes can be between two holes immediately next to each other and the distance can range from about 5 to 600 mm. In some instances, spacing between fastener holes can be between two holes on opposite edges of a plate and the distance can range from about 5 to 600 mm. In still other instances, spacing between fastener holes can be between two holes which are diagonally located from one another on a plate and the distance can range from about 5 to 600 mm.

One or more fasteners can be used to fasten the first (base or bottom) plate and second (top) plates through each of the fastener holes which may be present. The one or more fasteners can be selected from threaded fasteners, clamps, clips, push pins, rivets, a pneumatic press, a hydraulic press, or combinations thereof. Such fasteners are known in the art. The threaded fasteners can be bolts and nuts, such as those known in the art. In some other inserts the threaded fasteners are bolts and potted inserts, such as those known in the art. The one or more fasteners of any kind used can be made of any suitable material, such as a material selected from steel, titanium, aluminum, nylon, brass, bronze, and zinc. In instances where the fasteners include bolts the bolts may be applied using a suitable amount of bolt torque and the bolts may be tightened in any suitable tightening pattern to ensure uniform fastening between the two plates. Selection of suitable bolts (and nuts), bolting torques, and bolting patterns are known in the art.

In some instances, for the thermal interfaces and joints described the at least one or more additional contact regions provided by use of a stepped gasket provides an increase in temperature uniformity of the first and/or second plates exhibiting plate deformation, deflection, or curvature thereby providing an average thermal conductance across the thermal interface at least 25% higher, 30% higher, 40% higher, or 50% higher than that of the same thermal interface with a single layer gasket that is not stepped therein. The thermal conductance is defined as the time rate of steady state heat flow through a unit area of the thermal interface or joint induced by a unit temperature difference between the thermal interface surfaces.

In certain instances, for the thermal interfaces and joints described the at least one or more additional contact regions provided by use of a stepped gasket provides an increase in contact area between the stepped gasket and the at least one of the first and/or the second plates exhibiting plate deformation, deflection, or curvature thereby providing an average thermal conductance across the thermal interface at least 25% higher, 30% higher, 40% higher, or 50% higher than that of the same thermal interface with a single layer gasket that is not stepped therein. The thermal conductance is defined as the time rate of steady state heat flow through a unit area of the thermal interface or joint induced by a unit temperature difference between the thermal interface surfaces.

For the thermal interfaces and joints described each layer of the stepped gasket, as may be present, conforms to a surface of the at least one of the first and/or the second plates exhibiting plate deformation, deflection, or curvature at least at one or more contact regions.

A. Stepped Gaskets

The use of stepped gaskets introduces one or more contact regions or areas between the stepped gasket and the plate exhibiting deformation or curvature (see FIG. 2), as compared to use of a single layer gasket. Stepped gaskets can be designed to match or modify (improve) the thermal profile of the plates. Stepped gaskets can distribute contact loads more evenly for better overall uniformity. The number of layers of a stepped gasket (see FIGS. 3 and 4) and relative location of layers present in a stepped gasket can be positioned based on interface curvature modeling to properly position or produce a desired number of contact points or regions which improve the thermal performance of the thermal interface or joint.

The stepped gaskets include a first base layer and at least a second layer thereon. Additional layers, such as a third, fourth, or fifth layer may be included. The first base layer and the other layers can have any suitable shape or thickness, as needed. More typically, the first base layer and the other layers have the same shape (i.e., square, rectangular, circular, regular or irregular shaped, etc.). In some instances, the stepped gasket has a first base layer has dimensions which covers the full area of the plates in between which it is placed. In some other instances, the stepped gasket has a first base layer has dimensions which are smaller than the full area of the plates in between which it is placed, such as to cover at least about 50%, 60%, 70%, 80%, 90% of the area of the plates. The first base layer of the stepped gasket may include hole cut outs to accommodate the fastening holes present on the plates. Each subsequent layer is smaller in size (area) than the layer below it. In some instances, the layer atop has an area between about 1% to 50% the size of the area of the layer below it. For example, the second layer may have an area of about 1% to 75% or about 1% to 50% of the area of the first base layer and the third layer, if present, may be about 1% to 75% or about 1% to 50% smaller in area size than that of the second layer. The same is applicable to additional layers relative to the layer on which they are present on.

The use of stepped gaskets provides at least one or more contact regions with the at least one of the first and/or the second plates exhibiting plate deformation, deflection, or curvature, as compared to use of a single layer gasket that is not stepped. For a given stepped gasket each layer included may provide at least one, two, three, or four independent contact regions to the at least one of the first and/or the second plates exhibiting plate deformation, deflection, or curvature, as compared to a gasket without that layer. In some instances, the one or more contact regions resulting from use of a stepped gaskets can be said to contact at least about 5%, 10%, 20%, 30%, 40%, 50%, 60%, 70%, 80%, or 90% of the surface of the at least one of the first and/or the second plates exhibiting plate deformation, deflection, or curvature. In some instances, the one or more contact regions resulting from use of a stepped gaskets can be said to contact at least about 5% to 25%, about 5% to 50%, about 5% to 75%, or about 5% to 90%, and sub-ranges within, of the surface of the at least one of the first and/or the second plates exhibiting plate deformation, deflection, or curvature. The formation of one or more contact regions and resulting increase in contact area between the gasket and plates provides an increase in the overall thermal conductivity of the thermal interface or joint.

In some instances, the maximum deflection/deformation height of fastened plates can be determined or simulated which allows for formation of a stepped gasket having a combined height (i.e., sum of all layers which may be present) which meets or exceeds, preferably, the maximum deflection/deformation height of fastened plates. In some cases, each of the layers of the stepped gasket, as may be present, can each independently have a thickness in a range of between about 50 μm and about 500 μm. Moreover, in some cases, the increase in height in between layers of the stepped gasket is selected to be less than about 500 μm, less than about 250 μm, less than about 150 μm, or less than about 75 μm. In some instances, the increase in the height in between layers of the stepped gasket can be determined based on the theoretical deflection from the contacting surface under fastener load, as predicted by using Euler-Bernoulli beam theory, Timoshenko beam theory, or Kirchhoff-Love plate theory while considering the gasket layers as a compressible and elastic foundation.

In certain cases, the location of the perimeter of the second layer of the stepped gasket is selected and sized in order to intersect with the theoretical deflection of the contacting surface under fastener load, as predicted by the Euler-Bernoulli beam theory, Timoshenko beam theory, or Kirchhoff-Love plate theory, while considering the gaskets as a compressible and elastic foundation, and considering the deformation of the first layer of the stepped gasket near the fasteners. In some instances, the location of the perimeter of the third layer of the stepped gasket, when present, is sized to intersect with the theoretical deflection of the contacting surface under fastener load, as predicted by the Euler-Bernoulli beam theory, Timoshenko beam theory, or Kirchhoff-Love plate theory, considering the deformation of the first layer of the stepped gasket near the fasteners and the deformation of the first and second layers in the area, where the second layer contacts the second surface. In still other instances, the location of the perimeter of the fourth layer of the stepped gasket, when present, is sized to intersect with the theoretical deflection of the contacting surface under fastener load, as predicted by the Euler-Bernoulli beam theory, Timoshenko beam theory, or Kirchhoff-Love plate theory, considering the deformation of the first layer of the stepped gasket near the fasteners, the deformation of the first and second layers in the area where the second layer contacts the second surface, and the deformation of the first, second, and third layers, in the area where the third layer contacts the second surface.

In some instances, additional layers may be on top of each prior layer (i.e., second layer on first base layer, third layer on second layer, etc.). Additionally or alternatively, additional layers may be next to each other over a prior layer, such as a first base layer having a second and third layer on the base layer next to each other but where the third layer is not in contact or over the second layer.

In some instances, each of the layers of the stepped gasket, as may be present, can each independently demonstrate a modulus of elasticity in a range between about 0.1 MPa to about 50 MPa, about 0.1 MPa to about 100 MPa, about 0.1 MPa to about 150 MPa, or about 0.1 MPa to about 200 MPa. In some instances, each of the layers of the stepped gasket, as may be present, can each independently have a thermal interface resistance in a range between about 0.05 cm$^2$-° C./W to about 1 cm$^2$-° C./W, 0.05 cm$^2$-° C./W to about 5 cm$^2$-° C./W, 0.05 cm$^2$-° C./W to about 2 cm$^2$-° C./W, 0.05 cm$^2$-° C./W to about 3 cm$^2$-° C./W, 0.05 cm$^2$-° C./W to about 4 cm$^2$-° C./W, or 0.05 cm$^2$-° C./W to about 5 cm$^2$-° C./W.

In some instances, each of the plurality of layers of the stepped gasket is independently made of a material selected from graphite, carbon fiber, silicone, thermoplastic elastomers, rubber, and acrylic. Typically, each stepped gasket having at least two layers is made of layers made of identical materials where the number of layers and thickness of each may be varied, as appropriate. In some instances, layers of different material types could be used. In still some instances, the material making up each layer of stepped gasket can further include thermally and/or electrically conductive fillers, which are known in the art.

In some cases, the first base layer of the stepped gasket provides an electrical grounding path through the stepped gasket, preferably near the one or more fasteners. In still other cases, the first base layer can include an adhesive (i.e., a pressure adhesive or thermal adhesive), preferably on the side which does not have any additional layers thereon. For example, the adhesive may be present on the bottom of the first base layer shown on FIG. 2, 3A, or 3B to allow adhesion to the bottom (base) plate.

In some instances, stepped gasket can be made of multi-layered or multitiered structures containing carbon nanotube arrays or sheets. For example, the stepped gasket can be a multilayered or multitiered structure containing:

at least a first layer or tier comprising a carbon nanotube array comprising vertically aligned carbon nanotubes grown from opposing surfaces of a first planar substrate, and at least a second layer or tier comprising a carbon nanotube array comprising vertically aligned carbon nanotubes grown from opposing surfaces of a second planar substrate, wherein the at least first layer or tier and the at least second layer or tier are stacked and the vertically aligned carbon nanotubes of the at least first layer or tier at least partially interdigitate the vertically aligned carbon nanotubes of the at least second layer or tier which are interfacing each other. Such stepped gaskets are described in detail below.

i. Stepped Gaskets with Multilayered or Multitiered Structures

Multilayered or multitiered structures containing carbon nanotube arrays or sheets can be used to form stepped gaskets, as described below.

a. Carbon Nanotube Arrays and Carbon Nanotube Sheets

Carbon nanotube (CNT) arrays are described herein. Arrays contain a plurality of carbon nanotubes supported on, or attached to, the surface of an inert substrate/support, such as made of a metallic (e.g., Al or Au) foil or of metal alloys (i.e., steel). In some embodiments, the substrate/support can be a flexible, electrically, and thermally conductive substrate, such as graphite or other carbon-based material. In yet other embodiments, the substrate/support can be an electrically insulating substrate such as a flexible ceramic. The CNT arrays can be formed using the methods described below. The CNTs are vertically aligned on the substrate/support. CNTs are said to be "vertically aligned" when they are substantially perpendicular to the surface on which they are supported or attached. Nanotubes are said to be substantially perpendicular when they are oriented on average within 30, 25, 20, 15, 10, or 5 degrees of the surface normal.

Generally, the carbon nanotubes are present at a sufficient density such that the nanotubes are self-supporting and adopt a substantially perpendicular orientation to the surface of the multilayer substrate. Preferably, the nanotubes are spaced at optimal distances from one another and are of uniform height to minimize thermal transfer losses, thereby maximizing their collective thermal diffusivity. In some embodiments, the carbon nanotube density on the substrate surface ranges from about $1 \times 10^7$ to $1 \times 10^{11}$ nanotubes per mm$^2$, from about $1 \times 10^8$ to $1 \times 10^{10}$ nanotubes per mm$^2$, or from about $1 \times 10^9$ to $1 \times 10^{10}$ nanotubes per mm$^2$.

The CNT arrays contain nanotubes which are continuous from the top of the array (i.e., the surface formed by the distal end of the carbon nanotubes when vertically aligned on the multilayer substrate) to bottom of the array (i.e., the surface of the multilayer substrate). The CNT array may be formed from multi-wall carbon nanotubes (MWNTs), which generally refers to nanotubes having between approximately 4 and approximately 10 walls. The array may also be formed from few-wall nanotubes (FWNTs), which generally refer to nanotubes containing approximately 1-3 walls. FWNTs include single-wall carbon nanotubes (SWNTs), double-wall carbon nanotubes (DWNTS), and triple-wall carbon nanotubes (TWNTs). In certain embodiments, the nanotubes are MWNTs. In some embodiments, the diameter of MWNTs in the arrays ranges from 10 to 40 nm, more preferably 15 to 30 nm, most preferably about 20 nm. The length of CNTs in the arrays can range from 1 to 5,000 micrometers, preferably 5 to 5000 micrometers, preferably 5 to 2500 micrometers, more preferably 5 to 2000 micrometers, more preferably 5 to 1000 micrometers. In some embodiments, the length of CNTs in the arrays can range from 1-500 micrometers, even more preferably 1-100 micrometers.

The CNTs display strong adhesion to the multilayer substrate. In certain embodiments, the CNT array or sheet will remain substantially intact after being immersed in a solvent, such as ethanol, and sonicated for a period of at least five minutes. In particular embodiments, at least about 90%, 95%, 96%, 97%, 98%, 99%, or 99.9% of the CNTs remain on the surface after sonication in ethanol.

Carbon nanotube sheets are also described herein. The sheets contain a plurality of carbon nanotubes that support each other through strong van der Waals force interactions and mechanical entanglement to form a freestanding material. The CNT sheets can be formed using the methods described below. The CNTs form a freestanding sheet and are aligned in plane with the surface of this sheet. CNTs are said to be "aligned in plane" when they are substantially parallel to the surface of the sheet that they form. Nanotubes are said to be substantially parallel when they are oriented on average greater than 40, 50, 60, 70, 80, or 85 degrees from sheet surface normal.

Generally, the nanotubes are present at a sufficient density such that the nanotubes are self-supporting and adopt a substantially parallel orientation to the surface of the sheet. Preferably, the nanotubes are spaced at optimal distances from one another and are of uniform length to minimize thermal transfer losses, thereby maximizing their collective thermal diffusivity.

The CNT sheets may be formed from multi-wall carbon nanotubes (MWNTs), which generally refers to nanotubes having between approximately 4 and approximately 10 walls. The sheets may also be formed from few-wall nanotubes (FWNTs), which generally refers to nanotubes containing approximately 1-3 walls. FWNTs include single-wall carbon nanotubes (SWNTs), double-wall carbon nanotubes (DWNTS), and triple-wall carbon nanotubes (TWNTs). In certain embodiments, the nanotubes are MWNTs. In some embodiments, the diameter of MWNTs in the arrays ranges from 10 to 40 nm, more preferably 15 to 30 nm, most preferably about 20 nm. The length of CNTs in the sheets can range from 1 to 5,000 micrometers, preferably 100 to 5000 micrometers, preferably 500 to 5000 micrometers, more preferably 1000 to 5000 micrometers. In some embodiments, the length of CNTs in the sheets can range from 1-500 micrometers, even more preferably 1-100 micrometers.

The CNT arrays or sheets, as described above, can include a coating or coating material (terms can be used interchangeably) which adheres or is bonded to the CNTs therein. The coating/coating material can be applied as described below. In some embodiments, the coating contains one or more oligomeric materials, polymeric materials, waxes, or combinations thereof. In other embodiments, the coating contains one or more non-polymeric materials. In some embodiments, the coating can contain a mixture of oligomeric, waxes, and/or polymeric material and non-polymeric materials.

In certain embodiments, the coating material(s) act as a bonding agent(s) which can bonded, such as chemically, the carbon nanotubes of the stacked arrays or sheets. Without limitation, such coating material(s) which can act as bonding agents(s) can be selected from adhesives (i.e., acrylate adhesives) and a phase change material (i.e., a wax or waxes).

In some embodiments, the coating which adheres or is bonded to the CNTs of an array is applied before two or more CNT arrays or sheets are stacked while in other embodiments, the coating which adheres or is bonded to the CNTs of an array is applied following stacking of two or more CNT arrays or sheets. In yet other embodiments, the coating is infiltrated or backfilled into multilayered or multitiered structures formed by stacking CNT arrays or sheets and adheres or is bonded to the CNTs of the arrays forming the structure. As used herein, "infiltration" or "infiltrated" refer to a coating material(s) which are permeated through at least some of the carbon nanotubes of the arrays or sheets which were stacked to form the multilayered or multitiered structures. In some embodiments, the extent of infiltration is in the range of 0.1-99.9% of the volume space between the carbon nanotubes of the arrays or sheets. In some embodiments, the infiltrated coating material at least partially fills the interstitial space between carbon nanotubes while in some other embodiments the infiltrated coating coats at least some of the surface(s) of the carbon nanotubes, or both. In some embodiments, the infiltrated coating material fills all or substantially all (i.e., at least about 95%, 96%, 97%, 98%, or 99%) of the interstitial space between carbon nanotubes present in the tiers or layers of the structure formed by stacking of the CNT arrays or sheets.

A variety of materials can be coated onto the CNT arrays or sheets, prior to stacking, during stacking, or following stacking. In particular embodiments, the coatings can cause a decrease in the thermal resistance of the CNTs of arrays or sheets of structure having a plurality of layers or tiers, as defined herein. The coatings can be applied conformally to coat the tips and/or sidewalls of the CNTs. It is also desirable that the coating be reflowable as the interface is assembled using, for example, solvent, heat or some other easy to apply source. Polymers used as coatings must be thermally stable up to at least 130° C. In some embodiments, the coating is readily removable, such as by heat or dissolution in a solvent, to allow for "reworking" of the interface. "Reworking", as used herein, refers to breaking the interface (i.e., removing the coating) by applying solvent or heat.

In some embodiments, the coating is, or contains, one or more polymeric materials. The polymer or polymeric coating can contain a conjugated polymer, such as an aromatic, heteroaromatic, or non-aromatic polymer, or a non-conjugated polymer.

Suitable classes of conjugated polymers include polyaromatic and polyheteroaromatics including, but not limited to, polythiophenes (including alkyl-substituted polythiophenes), polystyrenes, polypyrroles, polyacetylenes, polyanilines, polyfluorenes, polyphenylenes, polypyrenes, polyazulenes, polynaphthalenes, polycarbazoles, polyindoles, polyazepines, poly(3,4-ethylenedioxythiophenes), poly(p-phenyl sulfides), and poly(p-phenylene vinylene). Suitable non-aromatic, conjugated polymers include, but are not limited to, polyacetylenes and polydiacetylenes. The polymer classes listed above include substituted polymers, wherein the polymer backbone is substituted with one or more functional groups, such as alkyl groups. In some embodiments, the polymer is polystyrene (PS). In other embodiments, the polymer is poly(3-hexythiophene) (P3HT). In other embodiments, the polymer is poly(3,4-3thylenedioxythiophene) (PEDOT) or poly(3,4-3thylenedioxythiophene) poly(styrenesulfonate) (PEDOT:PSS).

In other embodiments, the polymer is a non-conjugated polymer. Suitable non-conjugated include, but are not limited to, polyvinyl alcohols (PVA), poly(methyl methacrylates) (PMMA), polydimethylsiloxanes (PDMS), polyurethane, silicones, acrylics, and combinations (blends) thereof.

In other embodiments, the polymer is a paraffin wax. In other embodiments, the polymer is a synthetic wax such as Fischer-Tropsch waxes or polyethylene waxes. In other embodiments, the polymer is a wax that has a melting temperature above 80, 90, 100, 110, or 120° C., preferably above 130° C.

In other embodiments, the polymer is an adhesive, such as, but not limited to, a hot glue or hot melt adhesive that combines wax, tackifiers and a polymer base to provide improved adhesion properties to one or more surfaces. In some embodiments, the adhesive is a pressure sensitive adhesive. In certain other embodiments, the adhesive is a monomer that polymerizes upon contact with air or water such as a cyanoacrylate. In yet other embodiments, the adhesive is a combination of a pressure sensitive adhesive and a thermally activated (or activatable) adhesive polymers which enhances ease of adhesion of a multilayered or multitiered structure described herein which includes such a combination of coatings to a surface(s), by way of the pressure sensitive adhesive and additional and more permanent or semi-permanent adhesion by way of the thermal adhesive.

The CNT arrays or sheets can additionally be coated with one or more metal nanoparticles. One or more metal nanoparticles may be adsorbed to the distal ends and/or sidewalls of the CNTs to bond the distal ends and/or sidewalls of the CNTs to a surface, reduce thermal resistance between the CNT array or sheet and a surface, or combinations thereof. Metal nanoparticles can be applied to CNT arrays or sheets using a variety of methods known in the art. Examples of suitable metal nanoparticles include palladium, gold, silver, titanium, iron, nickel, copper, and combinations thereof.

a1. Flowable or Phase Change Materials

In certain embodiments, flowable or phase change materials are applied to the CNT arrays or sheets described above prior to stacking, during stacking, or following stacking. Flowable or phase change materials may be added to the CNT array or sheet to displace the air between CNTs and improve contact between the distal ends and/or sidewalls of CNTs and a surface, and as a result reduce thermal resistance of the array or sheet and the contact between the array or sheet and a surface, or combinations thereof. Flowable or phase change materials can be applied to CNT arrays using a variety of methods known in the art.

Examples of suitable flowable or phase change materials include paraffin waxes, polyethylene waxes, hydrocarbon-based waxes in general, and blends thereof. Other examples of suitable flowable or phase change materials that are neither wax nor polymeric include liquid metals, oils, organic-inorganic and inorganic-inorganic eutectics, and blends thereof. In some embodiments, the coating material, such as a non-polymeric coating material and the flowable or phase change material are the same material or materials.

b. Stacked CNT Arrays or Sheets

The CNT arrays or sheets described above are stacked according to the methods described below to afford stepped gaskets which represent multilayered or multitiered structures. In some instances, a stepped gasket is formed by contacting/stacking the carbon nanotubes of two CNT arrays or sheets, which interdigitate at least partially, and which may optionally be coated with a suitable coating material as described herein. In some instances, each layer of a stepped gasket may be formed from multiple CNT arrays or sheets which are stacked. For example, a base layer may include a multilayered or multitiered structure formed of at least two CNT arrays or sheets which are stacked, a second smaller layer atop the first base layer may also be a multilayered or multitiered structure formed of at least two or CNT arrays or sheets, and an optional third even smaller layer atop the second layer may also be a multilayered or multitiered structure formed of at least two or CNT arrays or sheets. By including more CNT arrays or sheets, the thickness of each of the layers formed of the multilayered or multitiered structures can be modified, as needed. In still other instances, a layer of the stepped gasket may be formed from multiple CNT arrays or sheets which are stacked and a layer atop may be formed of a single CNT array or sheet, which forms a layer by itself. Such combinations of layer types are envisioned.

In some embodiments the multilayered or multitiered structures can further include a coating, a coating of metallic nanoparticles, and/or a coating of flowable or phase change materials on the nanostructure elements, such as CNTs, of the arrays. Such a coating, a coating of metallic nanoparticles, and/or a coating of flowable or phase change materials are as described above.

In some instances, the stepped gaskets contain least two CNT arrays or sheets which are stacked and form a multilayered or multitiered structure. By including more CNT arrays or sheets, the thickness of the multilayered or multitiered stepped gaskets can be increased, as needed. In some embodiments, up to 3, 4, 5, 10, 15, 20, 25, 30, or more CNT arrays or sheets can be stacked according to the methods described below. For example, a stepped gasket having at least two layers can be formed by stacking two CNT arrays or sheets. A stepped gasket having at least three layers can be formed by stacking three CNT arrays or sheets. It is further understood that one CNT array or sheet acts as a first base layer. A second CNT array or sheet is stacked over the first base layer and is smaller in size and has a smaller surface area than the base layer, such as in FIG. 3A. In some instances, a third CNT array or sheet can stacked over the second layer and is smaller in size and has a smaller surface area than the second layer, such as in FIG. 3B. In some instances, the layer atop has an area between about 1% to 50% the size of the area of the layer below it. For example, the second layer may have an area of about 1% to 75% or about 1% to 50% of the area of the first base layer and the third layer, if present, may be about 1% to 75% or about 1% to 50% smaller in area size than that of the second layer. The same is applicable to additional layers relative to the layer on which they are present on.

The first base layer and the other layers made of CNT arrays or sheets can have the same shape (i.e., square, rectangular, circular, regular or irregular shaped, etc.). The first base layer of the stepped gasket may include hole cut outs to accommodate the fastening holes present on the plates In a non-limiting embodiment, at least two vertically aligned arrays or sheets formed on supports/substrates are stacked/contacted such that the nanostructure elements, such as CNTs, of the arrays at least partially interdigitate on contact. In one embodiment, full interdigitation of nanostructure elements of the arrays occurs within one another when stacked. In other embodiments the arrays may interdigitate only at the tips of the nanostructure elements, such as CNTs. In yet other embodiments, the individual nanostructures can navigate through the nanostructures of the adjacent array during the interdigitating process and the nanostructure elements of the individual arrays, such as the CNTs or some portion thereof, fully or substantially interdigitate within one another; "substantially," as used herein, refers to at least 95%, 96%, 97%, 98%, or 99% interdigitation between the nanostructure elements of the individual arrays. In some embodiments, the extent of interdigitation is in the range of about 0.1% to 99% or at least about 1%, 5%, 10%, 20%, 30%, 40%, 50%, 60%, 70%, 80%, 90%, or 95%.

In some embodiments the nanostructures of the stacked CNT arrays or sheets, which interdigitate at least partially, may also form into larger superstructures, such as, but not limited to, tube bundles, clumps, or rows. These superstructures may be formed through mechanisms such as capillary clumping or by way of application of a polymer coating prior to, during, or following the stacking process.

In some embodiments, a polymer coating and/or adhesive, or other coating as described above, is applied to the CNT array(s) which are subsequently stacked. In such embodiments, the thickness of the coating and/or adhesive, or other coating as described above, is about 1-1000 nm, more preferable 1-500 nm, and most preferably 1-100 nm.

In addition to the above, the favorable deformation mechanics of CNTs present in the multilayered or multitiered structures allow them to efficiently conform to the asperities of adjoining surfaces, resulting in high contact areas at interfaces.

b1. Reduction in Thermal Resistance

The stepped gaskets formed by stacking of CNT arrays or sheets described herein exhibit reduced interface thermal resistance. The thermal resistance can be measured using a variety of techniques known in the art, such as the guarded hot plate method.

In one embodiment, the thermal resistance of the multilayered or multitiered structures formed by stacking of such CNT arrays or sheets is reduced by at least about 25%, 30%, 35%, 40%, 45%, 50%, 55%, 60%, 65%, 70% or greater compared to single tiered structures when measured, for example, using a bolted joint, outfitted with thermocouples on the hot and cold sides of the joint. In certain embodiments, the CNT arrays or sheets and the multilayered or multitiered structures formed by stacking of such CNT arrays or sheets exhibit thermal resistances of less than about 1.0, 0.9, 0.8, 0.7, 0.6, 0.5, 0.4, 0.3, 0.2, or 0.1 $cm^2$ K/W. In such embodiments, the thermal resistance is about 0.4, preferably about 0.3 $cm^2$ K/W. These thermal resistances are as measured locally using a method, such as that described in ASTM D-5470. The composite thermal resistance of an actual thermal interface or part thereof depends on the actual part geometry and materials and could fall outside this range. In certain embodiments, the CNT arrays or sheets and the multilayered or multitiered structures formed by stacking of such CNT arrays or sheets exhibit thermal resistances of between about 2.0 and 0.1 $cm^2$ K/W. In such embodiments, the thermal resistance is about 2, 1.5, 1, 0.9, 0.8, 0.7, 0.6, 0.5, 0.4, 0.3, 0.2, or 0.1 $cm^2$ K/W. In some embodiments, the thermal resistance value of a multilayered or multitiered structures formed by stacking of CNT arrays or sheets is the same or substantially unchanged as compared to the value(s) of the single layer arrays used to form the stack; "substantially," as used herein refers to less than a 10%, 5%, 4%, 3%, 2%, or 1% change.

In one instance, the apparent thermal conductivity of the multilayered or multitiered structures formed by stacking CNT arrays or sheets, and which form stepped gaskets, is increased by at least about 25%, 30%, 35%, 40%, 45%, 50%, 55%, 60%, 65%, 70% or greater compared to single tiered structures. In some embodiments, the multilayered or multitiered gasket structures exhibit conductivity values in the range of about 1-2500 W/m-K, 1-2000 W/m-K, 1-1500

W/m-K, 1-1000 W/m-K, 1-500 W/m-K, 5-500 W/m-K, 5-400 W/m-K, 5-300 W/m-K, 5-200 W/m-K, 5-150 W/m-K, 5-100 W/m·K, or 3-30 W/m-K.

In some cases, a coating may be optionally applied to the CNT arrays or sheets prior to, during, or following stacking to form multilayered or multitiered structures formed by stacking of such CNT arrays or sheets. Coating(s) were shown to be an effective means for increasing the contact area and reducing the thermal resistance of CNT forest thermal interfaces. The bonding process added by inclusion of nanoscale coatings around individual CNT contacts includes, for example, pulling, through capillary action, of additional CNTs close to the interface to increase contact area.

In some instances, the multilayered or multitiered structures can demonstrate excellent elastic recovery properties following one or more repeated deformations, typically compressions, at varying pressures up to about 30, 50, 100, 200, 300, 400, 500 psi, or greater. Elastic recovery of the multilayered or multitiered structures, expressed as a percentage value, following one or more compressions can be greater than about 50%, 60%, 70%, 80%, 90%, 91%, 92%, 93%, 94%, 95%, 96%, 97%, 98%, or 99%. In some instances, the multilayered or multitiered structures described also demonstrate compression set properties following one or more repeated deformations, typically compressions, at varying pressures up to about 30, 50, 100, 200, 300, 400, 500 psi, or greater. Compression set of the multilayered or multitiered structures, expressed as a percentage value, following one or more compressions can be less than about 20%, 15%, 10%, 9%, 8%, 7%, 6%, 5%, 4%, 3%, 2%, 1%, 0.9%, 0.8%, 0.7%, 0.6%, 0.5%, 0.4%, 0.3%, 0.2%, or 0.1%.

ii. Shims

Figure 5A:
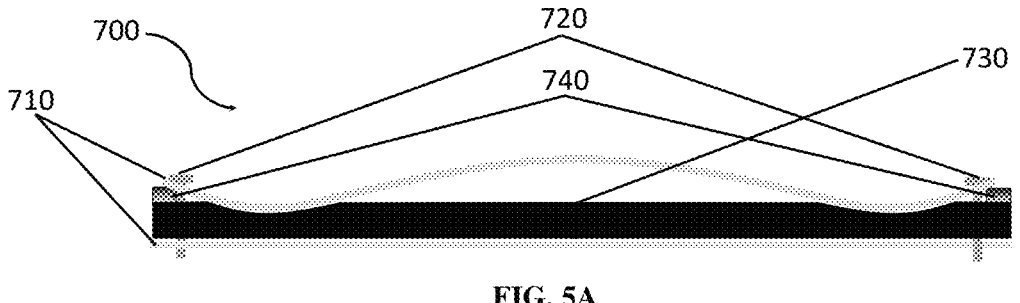
FIG. 5A is a non-limiting cross-sectional representational view of a thermal interface 700 having two plates 710 (top plate exhibiting plate deformation, deflection, or curvature), two fasteners 720 (i.e., bolts), a single layer gasket 730 having two shims 740 thereon.
Figure 5B:
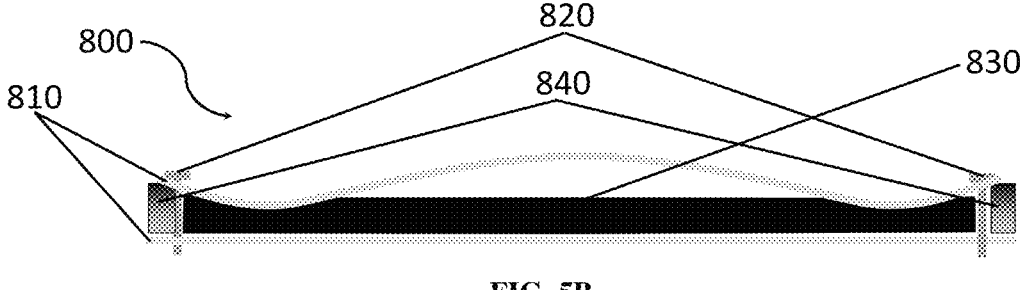
FIG. 5B is a non-limiting cross-sectional representational view of a thermal interface 800 having two plates 810 (top plate exhibiting plate deformation, deflection, or curvature), two fasteners 820 (i.e., bolts), a single layer gasket 830 and two shims 840 placed at the edge of the bottom plate.

The thermal interfaces and joints described above may also include one or more shims thereon, such as shown in FIGS. 5A, 5B, 6A, and 6B. As shown in FIG. 5A, the shims may be placed on top of the stepped gasket. Or, the shims may be placed in such a way that they are not in contact with the stepped gasket, as shown in FIG. 5B.

Figure 6A:
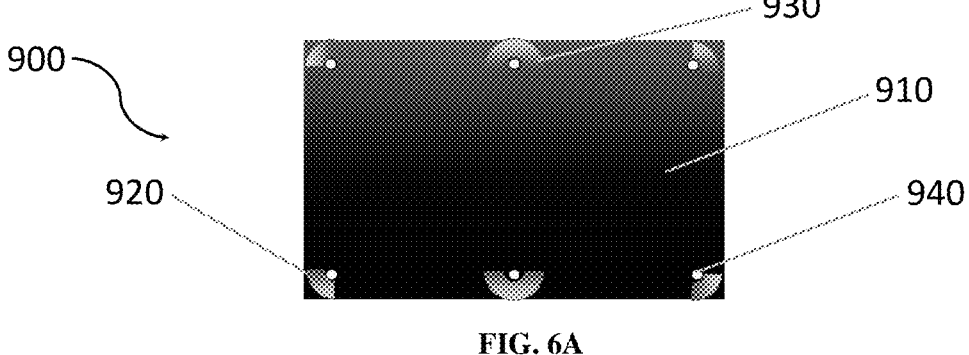
FIG. 6A is a non-limiting top down representational view of a plate and shims 900 having a bottom plate 910 with a plurality of fastener holes 940 and ¼ semi-annulus shims 920 and ½ semi-annulus shims 930 around, close to, and/or behind the fastener holes.
Figure 6B:
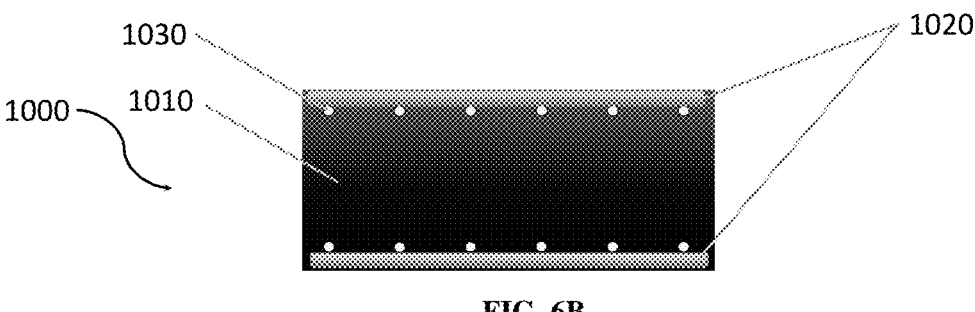
FIG. 6B is a non-limiting top down representational view of a plate and shims 1000 having a bottom plate 1010 with a plurality of fastener holes 1030 and two rectangular shims 1020 behind the fastener holes.

The one or more shims can be placed or located around, close to, and/or behind the one or more fasteners or fastener holes present on the plate(s), as shown in FIGS. 6A and 6B. In some instances, the one or more shims have a height which is selected to be equal to the height of the first layer of stepped gasket. In some instances, the one or more shims are positioned as far behind the fastener holes and fasteners as possible, such as on the very edge of the plates.

The shims can have any suitable shape. In some instances, the one or more shims preferably have an annulus or semi-annulus shape, which may be circular, square, or rectangular. Such semi-annulus shaped shims can be ¼, ½, ⅓, or ¾ semi-annulus shaped shims. Additionally or alternatively, shims having a square or rectangular shape can be used which are placed or located around, close to, and/or behind to at least one corner, edge, and/or center of the first and/or the second plates, as shown in FIG. 6B.

In some instances, the shims are made of a metal foil, preferably an aluminum or copper foil. In some other instances, the shims are made of a material selected from graphite, carbon fiber, silicone, thermoplastic elastomers, rubber, and acrylic.

In still other instances, the shims are made of a multilayered or multitiered structure comprising:

at least a first layer or tier comprising a carbon nanotube array comprising vertically aligned carbon nanotubes grown from opposing surfaces of a first planar substrate, and at least a second layer or tier comprising a carbon nanotube array comprising vertically aligned carbon nanotubes grown from opposing surfaces of a second planar substrate, wherein the at least first layer or tier and the at least second layer or tier are stacked and the vertically aligned carbon nanotubes of the at least first layer or tier at least partially interdigitate the vertically aligned carbon nanotubes of the at least second layer or tier which are interfacing each other. Such multilayered or multitiered structures, and their methods of making, are as described above and in Section VI below.

The one or more shims independently can have any suitable range. In some instances, the shims have a thickness in a range of between about 25 μm and about 500 μm. In some instances, the shims each independently demonstrate a modulus of elasticity in a range between about 5 MPa to about 130 GPa.

III. Thermal Interfaces or Joints Including Shims

As explained, thermal interfaces or joints formed of at least two plates, which are fastened, such as by nuts and bolts, and have a compressible material, such as a gasket, in between the plates have at least one plate which is subject to undesirable plate deformation, deflection, or curvature. Because such plate deformation, deflection, or curvature can cause formation of gap(s) which decrease and/or limit the contact area between the plates and gasket it produces a negative impact on the ability of the thermal interface to conduct heat efficiently.

In some instances, it is possible to counteract the effects of plate deformation, deflection, or curvature by including one or more shims in a thermal interface or joint having a single layer gasket therein.

In order to address the issues resulting from plate deformation, deflection, or curvature, a thermal interface or joint can include:

first and second plates;

a single layer gasket in between the first and second plates; and one or more fasteners joining the first and the second plates;

wherein at least one of the first and/or the second plates exhibits plate deformation, deflection, or curvature;

wherein one or more shims are present around, close to, and/or behind the one or more fasteners to reduce and/or mitigate the deformation, deflection, or curvature of the first and/or the second plates.

The thermal interface or joint includes two plates, a base plate (bottom plate) and a top plate, one or both of which typically exhibit deformation, deflection, or curvature, when the two plates are fastened (i.e., bolted). At least one of the plates is planar or substantially planar (where "substantially planar" means less than 0.25 um of out of flatness per mm of plate length). The top and bottom plates, such as shown in FIG. 2, can be made of any suitable material, having any suitable shape and dimensions, and thickness for use as a thermal interface. The two plates are usually made of the same material, have the same shape and dimensions, and optionally the same thickness. In some instances, the first (bottom or base) and second (top) plates have a square, rectangular, circular, oval, or ring shape. Typically, the single layer gasket has the same overall shape, for at least the first base layer, as the first and second plates. In some instances, plates having a thickness of about >4 mm can be considered as highly rigid plates, whereas plates having a thickness of about <4 mm can be considered as moderately or lowly rigid plates. In some instances, the plates independently have a thickness ranging from about 0.5 to about 30 mm, about 0.5 to about 20 mm, or about 0.5 to about 10 mm, and sub-ranges within. In certain instances, both plates are ¼" thick plates.

In some instances, the first (bottom or base) and second (top) plates can be independently made of a material selected from aluminum, copper, steel, titanium, zinc, metal matrix composites (such as AlSiC or aluminum-graphite), and metal laminate structures (such as honeycomb panels or fiber metal laminates). In some instances, the first (bottom or base) and second (top) plates can be independently made of a plastic selected from acrylonitrile butadiene styrene, polycarbonate, nylon, epoxy, glass-reinforced epoxy laminate material (such as FR4), high-pressure fiberglass laminate (such as G10), fiberglass composites, PEEK, polyethylene, polyethylene terephthalate glycol, polypropylene, polyurethane, polyvinyl chloride, polyimide, polytetrafluoroethylene, polylactic acid, PEDOT:PSS (poly(3,4-ethylenedioxythiophene) polystyrene sulfonate), PARA, polyphenylene sulfide, polyamide-imide, and polyetherimide. In still other instances, the first (bottom or base) and second (top) plates can be independently made of a ceramic selected from alumina, aluminum nitride, zirconia, zirconia alumina, beryllium oxide, carbon fiber, graphite, silicon carbide, silicon dioxide, silicon nitride, $Y_2O_3$, TiC, $SrAl_2O_3$, ZrC, HfC, TaC, $ZrB_2$, $HfB_2$, $Mo_2B_5$, $MoSi_2$ TiN, YrN, co-fired ceramics (including high temperature co-fired ceramics (HTCC), low temperature co-fired ceramics (LTCC), ultra low temperature co-fired ceramics (ULTCC), including those consisting of phosphates, silicates, borates, molybdates, vanadates, tellurates and tungstates).

The top and bottom plates of the thermal interface or joint are fastened by one or more fasteners where the one or more fasteners join the first and the second plates through one or more holes present on the top and the bottom plates. There may be any number of the one or more fastener holes present on both plates in the same positions on each plate, as may be needed to allow for fasteners to join the two plates. In some instances, there are at least 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, or 32 fastener holes on each plate. The fastener holes present can have any shape or size as needed. In some instances, the fastener holes are circular and can have a diameter which is suitable to a fastener, such as a bolt. In some instances, the fastener holes may be threaded to receive a threaded fastener. The fastener holes may be spaced in any relative arrangement which is suitable. However, it is preferred in certain instances for the fastener holes to present at one or more edges of the plates. Typically, the fastener holes are evenly spaced on the plates. A non-limiting example of fastener holes on a plate and their relative positions to each other is shown in FIG. 4. In some instances, spacing between fastener holes can be between two holes immediately next to each other and the distance can range from about 5 to 600 mm. In some instances, spacing between fastener holes can be between two holes on opposite edges of a plate and the distance can range from about 5 to 600 mm. In still other instances, spacing between fastener holes can be between two holes which are diagonally located from one another on a plate and the distance can range from about 5 to 600 mm.

One or more fasteners can be used to fasten the first (base or bottom) plate and second (top) plates through each of the fastener holes which may be present. The one or more fasteners can be selected from threaded fasteners, clamps, clips, push pins, rivets, a pneumatic press, a hydraulic press, or combinations thereof. Such fasteners are known in the art. The threaded fasteners can be bolts and nuts, such as those known in the art. In some other inserts the threaded fasteners are bolts and potted inserts, such as those known in the art. The one or more fasteners of any kind used can be made of any suitable material, such as a material selected from steel, titanium, aluminum, nylon, brass, bronze, and zinc. In instances where the fasteners include bolts the bolts may be applied using a suitable amount of bolt torque and the bolts may be tightened in any suitable tightening pattern to ensure uniform fastening between the two plates. Selection of suitable bolts (and nuts), bolting torques, and bolting patterns are known in the art.

In some instances, the single layer gasket is made of a material selected from graphite, carbon fiber, silicone, thermoplastic elastomers, rubber, and acrylic. In still some instances, the material making up the single layer gasket can further include thermally and/or electrically conductive fillers, as known in the art. The single layer gasket can have any suitable thickness. In some instances, the thickness ranges from between about 50 μm and about 500 μm.

The single layer gasket can have a modulus of elasticity in a range between about 0.1 MPa to about 50 MPa, about 0.1 MPa to about 100 MPa, about 0.1 MPa to about 150 MPa, or about 0.1 MPa to about 200 MPa. In some instances, each of the layers of the stepped gasket, as may be present, can each independently have a thermal interface resistance in a range between about 0.05 $cm^2$-° C./W to about 1 $cm^2$-° C./W, 0.05 $cm^2$-° C./W to about 5 $cm^2$-° C./W, 0.05 $cm^2$-° C./W to about 2 $cm^2$-° C./W, 0.05 $cm^2$-° C./W to about 3 $cm^2$-° C./W, 0.05 $cm^2$-° C./W to about 4 $cm^2$-° C./W, or 0.05 $cm^2$-° C./W to about 5 $cm^2$-° C./W.

In some cases, the single layer gasket can include an adhesive (i.e., a pressure adhesive or thermal adhesive), preferably on the side which contacts the bottom (base) plate to allow adhesion to the bottom (base) plate.

The use of one or more shims around, close to, and/or behind the one or more fasteners can reduce and/or mitigate the deformation, deflection, or curvature of the first and/or the second plates. The shims provide an increase in contact area between the single layer gasket and the at least one of the first and/or the second plates exhibiting plate deformation, deflection, or curvature. For example, FIGS. 5A and 5B illustrate that the presence of shims induces an increase in the contact area between the single layer gasket and the top plate exhibiting bending. In some instances, the increase in contact area provides an average thermal conductance across the thermal interface which is at least 25% higher, 30% higher, 40% higher, or 50% higher than that of the same thermal interface without shims present. The thermal conductance is defined as the time rate of steady state heat flow through a unit area of the thermal interface or joint induced by a unit temperature difference between the thermal interface surfaces. In some other instances, the shims can also provide an increase in the temperature uniformity of the first and/or second plates of the thermal interface or joint.

The shims may be placed on top of the single layer gasket. Or, the shims may be placed in such a way that they are not in contact with the single layer gasket. The one or more shims can be placed or located around, close to, and/or behind the one or more fasteners or fastener holes present on the plate(s). In some instances, the one or more shims have a height which is selected to be equal to the height of the single layer gasket. In some instances, the one or more shims are positioned as far behind the fastener holes and fasteners as possible, such as on the very edge of the plates.

The shims can have any suitable shape. In some instances, the one or more shims preferably have an annulus or semi-annulus shape, which may be circular, square, or rectangular. Such semi-annulus shaped shims can be ¼, ½, ⅓, or ¾ semi-annulus shaped shims. Additionally or alternatively, shims having a square or rectangular shape can be used which are placed or located around, close to, and/or behind to at least one corner, edge, and/or center of the first and/or the second plates, as shown in FIG. 6B.

In some instances, the shims are made of a metal foil, preferably an aluminum or copper foil. In some other instances, the shims are made of a material selected from graphite, carbon fiber, silicone, thermoplastic elastomers, rubber, and acrylic.

In still other instances, the shims are made of a multilayered or multitiered structure comprising:

at least a first layer or tier comprising a carbon nanotube array comprising vertically aligned carbon nanotubes grown from opposing surfaces of a first planar substrate, and at least a second layer or tier comprising a carbon nanotube array comprising vertically aligned carbon nanotubes grown from opposing surfaces of a second planar substrate, wherein the at least first layer or tier and the at least second layer or tier are stacked and the vertically aligned carbon nanotubes of the at least first layer or tier at least partially interdigitate the vertically aligned carbon nanotubes of the at least second layer or tier which are interfacing each other. Such multilayered or multitiered structures, and their methods of making, are as described above and in Section VI below.

The one or more shims independently can have any suitable range. In some instances, the shims have a thickness in a range of between about 25 μm and about 500 μm. In some instances, the shims each independently demonstrate a modulus of elasticity in a range between about 5 MPa to about 130 GPa.

IV. Methods for Preparing Thermal Interfaces or Joints with Stepped Gaskets

The thermal interfaces or joints having stepped gaskets therein can be prepared according to a method including the steps of:

(1) providing first and second plates;

(2) providing a stepped gasket;

(3) placing the stepped gasket in between the first and the second plates;

(4) joining the first and the second plates with one or more fasteners;

wherein at least one of the first and/or the second plates exhibits plate deformation, deflection, or curvature when joined by the one or more fasteners;

wherein the stepped gasket comprises a plurality of layers and there is at least a first base layer and at least a second layer, on top of and in contact with the first base layer, which has a surface area smaller than the surface area of the first base layer; and wherein the at least second layer of the stepped gasket provides at least one or more contact regions with the at least one of the first and/or the second plates exhibiting plate deformation, deflection, or curvature, as compared to a single layer gasket that is not stepped.

Typically, the one or more fasteners join the first and the second plates through one or more fastener holes present on the first and the second plates.

In some instances of the method, the two plates are usually made of the same material, have the same shape and dimensions, and optionally the same thickness. In some instances, the first (bottom or base) and second (top) plates have a square, rectangular, circular, oval, or ring shape. Typically, the stepped gasket has the same overall shape, for at least the first base layer, as the first and second plates. In some instances, plates having a thickness of about >4 mm can be considered as highly rigid plates, whereas plates having a thickness of about <4 mm can be considered as moderately or lowly rigid plates. In some instances, the plates independently have a thickness ranging from about 0.5 to about 30 mm, about 0.5 to about 20 mm, or about 0.5 to about 10 mm, and sub-ranges within. In certain instances, both plates are ¼" thick plates.

In some instances, the first (bottom or base) and second (top) plates can be independently made of a material selected from aluminum, copper, steel, titanium, zinc, metal matrix composites (such as AlSiC or aluminum-graphite), and metal laminate structures (such as honeycomb panels or fiber metal laminates). In some instances, the first (bottom or base) and second (top) plates can be independently made of a plastic selected from acrylonitrile butadiene styrene, polycarbonate, nylon, epoxy, glass-reinforced epoxy laminate material (such as FR4), high-pressure fiberglass laminate (such as G10), fiberglass composites, PEEK, polyethylene, polyethylene terephthalate glycol, polypropylene, polyurethane, polyvinyl chloride, polyimide, polytetrafluoroethylene, polylactic acid, PEDOT:PSS (poly(3,4-ethylenedioxythiophene) polystyrene sulfonate), PARA, polyphenylene sulfide, polyamide-imide, and polyetherimide. In still other instances, the first (bottom or base) and second (top) plates can be independently made of a ceramic selected from alumina, aluminum nitride, zirconia, zirconia alumina, beryllium oxide, carbon fiber, graphite, silicon carbide, silicon dioxide, silicon nitride, $Y_2O_3$, TiC, $SrAl_2O_3$, ZrC, HfC, TaC, $ZrB_2$, $HfB_2$, $Mo_2B_5$, $MoSi_2$ TiN, YrN, co-fired ceramics (including high temperature co-fired ceramics (HTCC), low temperature co-fired ceramics (LTCC), ultra low temperature co-fired ceramics (ULTCC), including those consisting of phosphates, silicates, borates, molybdates, vanadates, tellurates and tungstates).

The top and bottom plates of the thermal interface or joint are fastened by one or more fasteners where the one or more fasteners join the first and the second plates through one or more holes present on the top and the bottom plates. There may be any number of the one or more fastener holes present on both plates in the same positions on each plate, as may be needed to allow for fasteners to join the two plates. In some instances, there are at least 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, or 32 fastener holes on each plate. The fastener holes present can have any shape or size as needed. In some instances, the fastener holes are circular and can have a diameter which is suitable to a fastener, such as a bolt. In some instances, the fastener holes may be threaded to receive a threaded fastener. The fastener holes may be spaced in any relative arrangement which is suitable. However, it is preferred in certain instances for the fastener holes to present at one or more edges of the plates. Typically, the fastener holes are evenly spaced on the plates. In some instances, spacing between fastener holes can be between two holes immediately next to each other and the distance can range from about 5 to 600 mm. In some instances, spacing between fastener holes can be between two holes on opposite edges of a plate and the distance can range from about 5 to 600 mm. In still other instances, spacing between fastener holes can be between two holes which are diagonally located from one another on a plate and the distance can range from about 5 to 600 mm.

One or more fasteners can be used to fasten the first (base or bottom) plate and second (top) plates through each of the fastener holes which may be present. The one or more fasteners can be selected from threaded fasteners, clamps, clips, push pins, rivets, a pneumatic press, a hydraulic press, or combinations thereof. Such fasteners are known in the art. The threaded fasteners can be bolts and nuts, such as those known in the art. In some other inserts the threaded fasteners are bolts and potted inserts, such as those known in the art. The one or more fasteners of any kind used can be made of any suitable material, such as a material selected from steel, titanium, aluminum, nylon, brass, bronze, and zinc. In instances where the fasteners include bolts the bolts may be applied using a suitable amount of bolt torque and the bolts may be tightened in any suitable tightening pattern to ensure uniform fastening between the two plates. Selection of suitable bolts (and nuts), bolting torques, and bolting patterns are known in the art.

The stepped gaskets used in the method described above includes a first base layer and at least a second layer thereon. Additional layers, such as a third, fourth, or fifth layer may be included. The first base layer and the other layers can have any suitable shape or thickness, as needed. More typically, the first base layer and the other layers have the same shape (i.e., square, rectangular, circular, regular or irregular shaped, etc.). In some instances, the stepped gasket has a first base layer has dimensions which covers the full area of the plates in between which it is placed. In some other instances, the stepped gasket has a first base layer has dimensions which are smaller than the full area of the plates in between which it is placed, such as to cover at least about 50%, 60%, 70%, 80%, 90% of the area of the plates. The first base layer of the stepped gasket may include hole cut outs to accommodate the fastening holes present on the plates. Each subsequent layer is smaller in size (area) than the layer below it. In some instances, the layer atop has an area between about 1% to 50% than the size of the area of the layer below it. For example, the second layer may have an area of about 1% to 75% or about 1% to 50% of the area of the the first base layer and the third layer, if present, may be about 1% to 75% or about 1% to 50% smaller in area size than that of the second layer. The same is applicable to additional layers relative to the layer on which they are present on. In some cases, each of the layers of the stepped gasket, as may be present, can each independently have a thickness in a range of between about 50 μm and about 500 μm. Moreover, in some cases, the increase in height in between layers of the stepped gasket is selected to be less than about 500 μm, less than about 250 μm, less than about 150 μm, or less than about 75 μm. In some instances, the increase in the height in between layers of the stepped gasket can be determined based on the theoretical deflection from the contacting surface under fastener load, as predicted by using Euler-Bernoulli beam theory, Timoshenko beam theory, or Kirchhoff-Love plate theory while considering the gasket layers as a compressible and elastic foundation.

In some instances of the method, each of the plurality of layers of the stepped gasket can be independently made of a material selected from graphite, carbon fiber, silicone, thermoplastic elastomers, rubber, and acrylic. Typically, each stepped gasket having at least two layers is made of layers made of identical materials where the number of layers and thickness of each may be varied, as appropriate. In some instances, layers of different material types could be used. In still some instances, the material making up each layer of stepped gasket can further include thermally and/or electrically conductive fillers, which are known in the art.

In still other cases, the first base layer can include an adhesive (i.e., a pressure adhesive or thermal adhesive), preferably on the side which does not have any additional layers thereon.

In some cases, the stepped gasket can be made of multilayered or multitiered structures containing carbon nanotube arrays or sheets. For example, the stepped gasket can be a multilayered or multitiered structure containing:

at least a first layer or tier comprising a carbon nanotube array comprising vertically aligned carbon nanotubes grown from opposing surfaces of a first planar substrate, and at least a second layer or tier comprising a carbon nanotube array comprising vertically aligned carbon nanotubes grown from opposing surfaces of a second planar substrate, wherein the at least first layer or tier and the at least second layer or tier are stacked and the vertically aligned carbon nanotubes of the at least first layer or tier at least partially interdigitate the vertically aligned carbon nanotubes of the at least second layer or tier which are interfacing each other. Such stepped gaskets made of multilayered or multitiered structures, and their methods of making, are as described above and in Sections II and VI.

In some instances, the method further includes a step of placing one or more shims between the first and the second plates prior to step (4). In some cases, the shims are placed during step (3) or before or following step (3). The one or more shims can be placed or located around, close to, and/or behind the one or more fasteners or fastener holes present on the plate(s). The shims can have any suitable shape. In some instances, the one or more shims preferably have an annulus or semi-annulus shape, which may be circular, square, or rectangular. Such semi-annulus shaped shims can be ¼, ½, ⅓, or ¾ semi-annulus shaped shims. Additionally or alternatively, shims having a square or rectangular shape can be used which are placed or located around, close to, and/or behind to at least one corner, edge, and/or center of the first and/or the second plates. In some instances, the one or more shims have a height which is selected to be equal to the height of the first layer of stepped gasket. In some instances, the one or more shims are positioned as far behind the fastener holes and fasteners as possible, such as on the very edge of the plates.

In some instances of the method, the shims are made of a metal foil, preferably an aluminum or copper foil. In some other instances, the shims are made of a material selected from graphite, carbon fiber, silicone, thermoplastic elastomers, rubber, and acrylic.

In still other instances, the shims are made of a multilayered or multitiered structure comprising:

at least a first layer or tier comprising a carbon nanotube array comprising vertically aligned carbon nanotubes grown from opposing surfaces of a first planar substrate, and at least a second layer or tier comprising a carbon nano-tube array comprising vertically aligned carbon nano-tubes grown from opposing surfaces of a second planar substrate, wherein the at least first layer or tier and the at least second layer or tier are stacked and the vertically aligned carbon nanotubes of the at least first layer or tier at least partially interdigitate the vertically aligned carbon nanotubes of the at least second layer or tier which are interfacing each other. Such multilayered or multitiered structures, and their methods of making, are as described above and in Section VI below.

The one or more shims independently can have any suitable range. In some instances, the shims have a thickness in a range of between about 25 μm and about 500 μm. In some instances, the shims each independently demonstrate a modulus of elasticity in a range between about 5 MPa to about 130 GPa.

V. Methods for Preparing Thermal Interfaces or Joints with Shims

The thermal interfaces or joints having shims therein can be prepared according to a method including the steps of:

(1) providing first and second plates;

(2) providing a single layer gasket;

(3) placing the single layer gasket in between the first and the second plates;

(4) placing one or more shims in between the first and the second plates;

(5) joining the first and the second plates with one or more fasteners;

wherein at least one of the first and/or the second plates exhibits plate deformation, deflection, or curvature when joined by the one or more fasteners;

wherein one or more shims are present around, close to, and/or behind the one or more fasteners to reduce and/or mitigate the deformation, deflection, or curvature of the first and/or the second plates.

In some instances, steps (3) and (4) may be combined into a single step.

For the method described, the two plates are usually made of the same material, have the same shape and dimensions, and optionally the same thickness. In some instances, the first (bottom or base) and second (top) plates have a square, rectangular, circular, oval, or ring shape. Typically, the single layer gasket has the same overall shape, for at least the first base layer, as the first and second plates. In some instances, plates having a thickness of about >4 mm can be considered as highly rigid plates, whereas plates having a thickness of about <4 mm can be considered as moderately or lowly rigid plates. In some instances, the plates independently have a thickness ranging from about 0.5 to about 30 mm, about 0.5 to about 20 mm, or about 0.5 to about 10 mm, and sub-ranges within. In certain instances, both plates are ¼" thick plates.

In some instances, the first (bottom or base) and second (top) plates can be independently made of a material selected from aluminum, copper, steel, titanium, zinc, metal matrix composites (such as AlSiC or aluminum-graphite), and metal laminate structures (such as honeycomb panels or fiber metal laminates). In some instances, the first (bottom or base) and second (top) plates can be independently made of a plastic selected from acrylonitrile butadiene styrene, poly-carbonate, nylon, epoxy, glass-reinforced epoxy laminate material (such as FR4), high-pressure fiberglass laminate (such as G10), fiberglass composites, PEEK, polyethylene, polyethylene terephthalate glycol, polypropylene, polyure-thane, polyvinyl chloride, polyimide, polytetrafluoroethyl-ene, polylactic acid, PEDOT:PSS (poly(3,4-ethylenedioxy-thiophene) polystyrene sulfonate), PARA, polyphenylene sulfide, polyamide-imide, and polyetherimide. In still other instances, the first (bottom or base) and second (top) plates can be independently made of a ceramic selected from alumina, aluminum nitride, zirconia, zirconia alumina, beryllium oxide, carbon fiber, graphite, silicon carbide, silicon dioxide, silicon nitride, $Y_2O_3$, TiC, $SrAl_2O_3$, ZrC, HfC, TaC, $ZrB_2$, $HfB_2$, $Mo_2B_5$, $MoSi_2$ TiN, YrN, co-fired ceramics (including high temperature co-fired ceramics (HTCC), low temperature co-fired ceramics (LTCC), ultra low temperature co-fired ceramics (ULTCC), including those consisting of phosphates, silicates, borates, molyb-dates, vanadates, tellurates and tungstates).

The top and bottom plates of the thermal interface or joint are fastened by one or more fasteners where the one or more fasteners join the first and the second plates through one or more holes present on the top and the bottom plates. There may be any number of the one or more fastener holes present on both plates in the same positions on each plate, as may be needed to allow for fasteners to join the two plates. In some instances, there are at least 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, or 32 fastener holes on each plate. The fastener holes present can have any shape or size as needed. In some instances, the fastener holes are circular and can have a diameter which is suitable to a fastener, such as a bolt. In some instances, the fastener holes may be threaded to receive a threaded fastener. The fastener holes may be spaced in any relative arrangement which is suitable. How-ever, it is preferred in certain instances for the fastener holes to present at one or more edges of the plates. Typically, the fastener holes are evenly spaced on the plates. A non-limiting example of fastener holes on a plate and their relative positions to each other is shown in FIG. 4. In some instances, spacing between fastener holes can be between two holes immediately next to each other and the distance can range from about 5 to 600 mm. In some instances, spacing between fastener holes can be between two holes on opposite edges of a plate and the distance can range from about 5 to 600 mm. In still other instances, spacing between fastener holes can be between two holes which are diago-nally located from one another on a plate and the distance can range from about 5 to 600 mm.

One or more fasteners can be used to fasten the first (base or bottom) plate and second (top) plates through each of the fastener holes which may be present. The one or more fasteners can be selected from threaded fasteners, clamps, clips, push pins, rivets, a pneumatic press, a hydraulic press, or combinations thereof. Such fasteners are known in the art. The threaded fasteners can be bolts and nuts, such as those known in the art. In some other inserts the threaded fasteners are bolts and potted inserts, such as those known in the art. The one or more fasteners of any kind used can be made of any suitable material, such as a material selected from steel, titanium, aluminum, nylon, brass, bronze, and zinc. In instances where the fasteners include bolts the bolts may be applied using a suitable amount of bolt torque and the bolts may be tightened in any suitable tightening pattern to ensure uniform fastening between the two plates. Selection of suitable bolts (and nuts), bolting torques, and bolting pat-terns are known in the art.

In some instances of the method, the single layer gasket is made of a material selected from graphite, carbon fiber, silicone, thermoplastic elastomers, rubber, and acrylic. In still some instances, the material making up the single layer gasket can further include thermally and/or electrically conductive fillers, as known in the art. The single layer gasket can have any suitable thickness. In some instances, the thickness ranges from between about 50 μm and about 500 μm.

In some cases, the single layer gasket can include an adhesive (i.e., a pressure adhesive or thermal adhesive), preferably on the side which contacts the bottom (base) plate to allow adhesion to the bottom (base) plate.

The use of one or more shims around, close to, and/or behind the one or more fasteners can reduce and/or mitigate the deformation, deflection, or curvature of the first and/or the second plates. The shims provide an increase in contact area between the single layer gasket and the at least one of the first and/or the second plates exhibiting plate deformation, deflection, or curvature. For example, FIGS. 5A and 5B illustrate that the presence of shims induces an increase in the contact area between the single layer gasket and the top plate exhibiting bending.

The shims may be placed on top of the single layer gasket. Or, the shims may be placed in such a way that they are not in contact with the single layer gasket. The one or more shims can also be placed or located around, close to, and/or behind the one or more fasteners or fastener holes present on the plate(s). In some instances, the one or more shims have a height which is selected to be equal to the height of the single layer gasket. In some instances, the one or more shims are positioned as far behind the fastener holes and fasteners as possible, such as on the very edge of the plates.

The shims can have any suitable shape. In some instances, the one or more shims preferably have an annulus or semi-annulus shape, which may be circular, square, or rectangular. Such semi-annulus shaped shims can be ¼, ½, ⅓, or ¾ semi-annulus shaped shims. Additionally or alternatively, shims having a square or rectangular shape can be used which are placed or located around, close to, and/or behind to at least one corner, edge, and/or center of the first and/or the second plates, as shown in FIG. 6B.

In some instances, the shims are made of a metal foil, preferably an aluminum or copper foil. In some other instances, the shims are made of a material selected from graphite, carbon fiber, silicone, thermoplastic elastomers, rubber, and acrylic.

In still other instances, the shims are made of a multilayered or multitiered structure comprising:

at least a first layer or tier comprising a carbon nanotube array comprising vertically aligned carbon nanotubes grown from opposing surfaces of a first planar substrate, and at least a second layer or tier comprising a carbon nanotube array comprising vertically aligned carbon nanotubes grown from opposing surfaces of a second planar substrate, wherein the at least first layer or tier and the at least second layer or tier are stacked and the vertically aligned carbon nanotubes of the at least first layer or tier at least partially interdigitate the vertically aligned carbon nanotubes of the at least second layer or tier which are interfacing each other. Such multilayered or multitiered structures, and their methods of making, are as described in Section II and VI below.

VI. Methods for Preparing Multilayered or Multitiered Structures

Multilayered or multitiered structures made of stacked carbon nanotube arrays or sheets, as discussed above, can be prepared as follows. These multilayered or multitiered structures can be used as stepped gaskets or may form one or more layers of stepped gaskets, as well as shims, as described elsewhere.

A. Carbon Nanotube Arrays

Carbon nanotube arrays can be prepared using techniques well known in the art. In one embodiment, the arrays are prepared as described in U.S. Publication No. 2014-0015158-A1, incorporated herein by reference. This method involves the use of multilayer substrates to promote the growth of dense vertically aligned CNT arrays and provide excellent adhesion between the CNTs and metal surfaces.

The multilayer substrates contain three or more layers deposited on an inert support, such as a metal surface. Generally, the multilayer substrate contains an adhesion layer, an interface layer, and a catalytic layer, deposited on the surface of an inert support. Generally, the support is formed at least in part from a metal, such as aluminum, platinum, gold, nickel, iron, tin, lead, silver, titanium, indium, copper, or combinations thereof. In certain instances, the support is a metallic foil, such as aluminum or copper foil. The support may also be a surface of a device, such as a conventional heat sink or heat spreader used in heat exchange applications.

The adhesion layer is formed of a material that improves the adhesion of the interface layer to the support. In certain embodiments, the adhesion layer is a thin film of iron. Generally, the adhesion layer must be thick enough to remain a continuous film at the elevated temperatures used to form CNTs. The adhesion layer also generally provides resistance to oxide and carbide formation during CNT synthesis at elevated temperatures.

The interface layer is preferably formed from a metal which is oxidized under conditions of nanotube synthesis or during exposure to air after nanotube synthesis to form a suitable metal oxide. Examples of suitable materials include aluminum. Alternatively, the interface layer may be formed from a metal oxide, such as aluminum oxide or silicon oxide. Generally, the interface layer is thin enough to allow the catalytic layer and the adhesion layer to diffuse across it. In some embodiments wherein the catalytic layer and the adhesion layer have the same composition, this reduces migration of the catalyst into the interface layer, improving the lifetime of the catalyst during nanotube growth.

The catalytic layer is typically a thin film formed from a transition metal that can catalyze the formation of carbon nanotubes via chemical vapor deposition. Examples of suitable materials that can be used to form the catalytic layer include iron, nickel, cobalt, rhodium, palladium, and combinations thereof. In some embodiments, the catalytic layer is formed of iron. The catalytic layer is of appropriate thickness to form catalytic nanoparticles or aggregates under the annealing conditions used during nanotube formation.

In other embodiments, the multilayer substrate serves as catalytic surface for the growth of a CNT array. In these instances, the process of CNT growth using chemical vapor deposition alters the morphology of the multilayer substrate. Specifically, upon heating, the interface layer is converted to a metal oxide, and forms a layer or partial layer of metal oxide nanoparticles or aggregates deposited on the adhesion layer. The catalytic layer similarly forms a series of catalytic nanoparticles or aggregates deposited on the metal oxide nanoparticles or aggregates. During CNT growth, CNTs form from the catalytic nanoparticles or aggregates. The resulting CNT arrays contain CNTs anchored to an inert support via an adhesion layer, metal oxide nanoparticles or aggregates, and/or catalytic nanoparticles or aggregates.

In particular embodiments, the multilayer substrate is formed from an iron adhesion layer of about 30 nm in thickness, an aluminum or alumina interface layer of about 10 nm in thickness, and an iron catalytic layer of about 3 nm in thickness deposited on a metal surface. In this embodiment, the iron adhesion layer adheres to both the metal surface and the Al (alumina nanoparticles or aggregates after growth) or $Al_2O_3$ interface layer. The iron catalytic layer forms iron nanoparticles or aggregates from which CNTs grow. These iron nanoparticles or aggregates are also bound to the alumina below.

As a result, well bonded interfaces exist on both sides of the oxide interface materials. Of metal/metal oxide interfaces, the iron-alumina interface is known to be one of the strongest in terms of bonding and chemical interaction. Further, metals (e.g., the iron adhesion layer and the metal surface) tend to bond well to each other because of strong electronic coupling. As a consequence, the CNTs are strongly anchored to the metal surface.

Further, subsurface diffusion of iron from the catalytic layer during nanotube growth is reduced because the same metal is on both sides of the oxide support, which balances the concentration gradients that would normally drive diffusion. Therefore, catalyst is not depleted during growth, improving the growth rate, density, and yield of nanotubes in the array.

In some embodiments, the CNT array is formed by vertically aligning a plurality of CNTs on the multilayer substrate described above. This can be accomplished, for example, by transferring an array of CNTs to the distal ends of CNTs grown on the multilayer substrate. In some embodiments, tall CNT arrays are transferred to the distal ends of very short CNTs on the multilayer substrate. This technique improves the bond strength by increasing the surface area for bonding.

The inert support for the CNT array or sheet can be a piece of metal foil, such as aluminum foil. In these cases, CNTs are anchored to a surface of the metal foil via an adhesion layer, metal oxide nanoparticles or aggregates, and catalytic nanoparticles or aggregates. In some instances only one surface (i.e., side) of the metal foil contains an array or sheet of aligned CNTs anchored to the surface. In other cases, both surfaces (i.e., sides) of the metal foil contain an array or sheet of aligned CNTs anchored to the surface. In other embodiments, the inert support for the CNT array or sheet is a surface of a conventional metal heat sink or heat spreader. In these cases, CNTs are anchored to a surface of the heat sink or heat spreader via an adhesion layer, metal oxide nanoparticles or aggregates, and catalytic nanoparticles or aggregates. This functionalized heat sink or heat spreader may then be abutted or adhered to a heat source, such as an integrated circuit package.

B. Carbon Nanotube Sheets

Carbon nanotube sheets can be prepared using techniques well known in the art. In one embodiment, the sheets are prepared as described in U.S. Pat. No. 7,993,620 B2. In this embodiment, CNT agglomerates are collected into sheets in-situ inside the growth chamber on metal foil substrates. The sheets can then be densified by removing the solvent. In another embodiment, the CNT sheets are made by vacuum filtration of CNT agglomerates that are dispersed in a solvent.

C. Coated Nanotube Arrays and Sheets

1. Polymer Coatings

Polymers to be coated can be dissolved in one or more solvents and spray or dip coated or chemically or electrochemically deposited onto the vertical CNT forests or arrays grown on a substrate, or on a sheet, as described above. The coating materials can also be spray coated in powder form onto the top of vertical CNT forests or arrays grown on a substrate, or on CNT sheets as described above. The coatings includes polymers or molecules that bond to CNTs through van der Waals bonds, π-π stacking, mechanical wrapping and/or covalent bonds and bond to metal, metal oxide, or semiconductor material surfaces through van der Waals bonds, π-π stacking, and/or covalent bonds.

For spray or dip coating, coating solutions can be prepared by sonicating or stirring the coating materials for a suitable amount of time in an appropriate solvent. The solvent is typically an organic solvent or solvent and should be a solvent that is easily removed, for example by evaporation at room temperature or elevated temperature. Suitable solvents include, but are not limited to, chloroform, xylenes, hexanes, pyridine, tetrahydrofuran, ethyl acetate, and combinations thereof. The polymer can also be spray coated in dry form using powders with micron scale particle sizes, i.e., particles with diameters less than about 100, 50, 40, 20, 10 micrometers. In this embodiment, the polymer powder would need to be soaked with solvent or heated into a liquid melt to spread the powder particles into a more continuous coating after they are spray deposited.

The thickness of the coatings is generally between 1 and 1000 nm, preferably between 1 and 500 nm, more preferably between 1 and 100 nm, most preferably between 1 and 50 nm. In some embodiments, the coating thickness is less than 500, 450, 400, 350, 300, 250, 200, 150, 100, 90, 80, 70, 60, 50, 40, 30, 20 or 10 nm.

Spray coating process restricts the deposition of coating to the CNT tips and limits clumping due to capillary forces associated with the drying of the solvent. The amount of coating visible on the CNT arrays increases with the number of sprays. Alternative techniques can be used to spray coat the coating materials onto the CNT arrays including techniques more suitable for coating on a commercial scale.

In another embodiment that demonstrates a coating process, CNT sheets are dipped into coating solutions or melted coatings to coat CNTs throughout the thickness of the sheets, increasing the thermal conductivity of the sheet in the cross-plane direction by greater than 20, 30, 50, or 70%. These coated sheets are then placed between a chip and heat sink or heat spreader with the application of solvent or heat to reflow the polymer and bond the CNT sheet between the chip and heat sink or spreader to reduce the thermal resistance between the chip and heat sink or heat spreader.

In other embodiments, the coating material can be deposited on the CNT array or sheet using deposition techniques known in the art, such as chemical deposition (e.g., chemical vapor deposition (CVD)), aerosol spray deposition, and electrochemical deposition.

In one embodiment, a polymer coating can be applied by electrochemical deposition. In electrochemical deposition, the monomer of the polymer is dissolved in electrolyte and the CNT array or sheet is used as the working electrode, which is opposite the counter electrode. A potential is applied between the working and counter electrode with respect to a third reference electrode. The monomer is electrooxidized on the CNT array tips or sheet sidewalls that face the electrolyte as a result of the applied potential. Controlling the total time in which the potential is applied controls the thickness of the deposited polymer layer.

In some embodiments, the coating material is, or contains, one or more oligomeric and/or polymeric materials. In particular embodiments, the polymer can be a conjugated polymer, including aromatic and non-aromatic conjugated polymers. Suitable classes of conjugated polymers include polyaromatic and polyheteroaromatics including, but not limited to, polythiophenes (including alkyl-substituted polythiophenes), polystyrenes, polypyrroles, polyacetylenes, polyanilines, polyfluorenes, polyphenylenes, polypyrenes, polyazulenes, polynaphthalenes, polycarbazoles, polyindoles, polyazepines, poly(3,4-ethylenedioxythiophenes), poly(p-phenyl sulfides), and poly(p-phenylene vinylene). Suitable non-aromatic polymers include, but are not limited to, polyacetylenes and polydiacetylenes. The polymer classes listed above include substituted polymers, wherein the polymer backbone is substituted with one or more functional groups, such as alkyl groups. In some embodiments, the polymer is polystyrene (PS). In other embodiments, the polymer is poly(3-hexythiophene) (P3HT).

In other embodiments, the polymer is a non-conjugated polymer. Suitable non-conjugated include, but are not limited to, polyvinyl alcohols (PVA), poly(methyl methacrylates) (PMMA), polysiloxanes, polyurethanes, polydimethylsiloxanes (PDMS), and combinations (blends) thereof.

In other embodiments, the polymer is a paraffin wax. In other embodiments, the polymer is a synthetic wax such as Fischer-Tropsch waxes or polyethylene waxes. In other embodiments, the polymer is a wax that has a melting temperature above 80, 90, 100, 110, and 120° C., preferably above 130° C.

In some other embodiments, the polymer is an adhesive, such as, but not limited to, a hot glue or hot melt adhesive that combines wax, tackifiers and a polymer base to provide improved surface adhesion. In some embodiments, the adhesive is a pressure sensitive adhesive. In certain other embodiments the adhesive is a monomer that polymerizes upon contact with air or water such as a cyanoacrylate. In yet other embodiments, the adhesive is a combination of a pressure sensitive adhesive polymer and a thermally activated (or activatable) adhesive polymer which enhances ease of adhesion of a multilayered or multitiered structure described herein which includes such a combination of coatings to a surface(s), by way of the pressure sensitive adhesive and additional and more permanent or semi-permanent adhesion by way of the thermal adhesive.

2. Metallic Nanoparticles

The CNT arrays or sheets can be coated with one or more metal nanoparticles. One or more metal nanoparticles may be adsorbed to the distal ends and/or sidewalls of the CNTs to bond the distal ends of the CNTs to a surface, reduce thermal resistance between the CNT array or sheet and a surface, or combinations thereof. Metal nanoparticles can be applied to CNT arrays or sheets using a variety of methods known in the art. For example, a solution of metal thiolate such as palladium hexadecanethiolate can be sprayed or spin coated onto the distal ends and/or sidewalls of the CNTs, and the organics can be baked off to leave palladium nanoparticles. In another example, electron-beam or sputter deposition can be used to coat metal nanoparticles or connected "film-like" assemblies of nanoparticles onto the distal ends and/or sidewalls of the CNTs. The metallic particles can be coated simultaneously with the coating or before or after coating.

Examples of suitable metal nanoparticles include palladium, gold, silver, titanium, iron, nickel, copper, and combinations thereof.

3. Flowable or Phase Change Materials

In certain embodiments, flowable or phase change materials can be applied to the CNT array or sheet. Flowable or phase change materials may be added to the CNT array or sheet to displace the air between CNTs and improve contact between the distal ends of CNTs and a surface, and as a result reduce thermal resistance of the array or sheet and the contact between the array or sheet and a surface, or combinations thereof. Flowable or phase change materials can be applied to CNT arrays or sheets using a variety of methods known in the art. For example, flowable or phase change materials in their liquid state can be wicked into a CNT array or sheet by placing the array or sheet in partial or full contact with the liquid.

Examples of suitable flowable or phase change materials include paraffin waxes, polyethylene waxes, hydrocarbon-based waxes in general, and blends thereof. Other examples of suitable flowable or phase change materials that are neither wax nor polymeric include liquid metals, oils, organic-inorganic and inorganic-inorganic eutectics, and blends thereof. In some embodiments, the coating material(s) and the flowable or phase change material are the same.

The coatings, metallic particles, and/or flow or phase change materials described above can be applied directly to the CNT arrays or sheets and the coated CNT arrays or sheets can subsequently be stacked to form multilayered or multitiered structures. In certain other embodiments, the coatings, metallic particles, and/or flow or phase change materials described above are applied during the stacking of two or more CNT arrays or sheets. In still other embodiments, the coatings, metallic particles, and/or flow or phase change materials described above are applied following the stacking of two or more CNT arrays or sheets. In non-limiting embodiments, multilayered or multitiered structure(s) are formed by first stacking two or more CNT arrays or sheets and then the at least partially interdigitated tiers of the formed structures are infiltrated with one or more coatings, metallic particles, and/or flow or phase change materials, or combinations thereof. The introduction of such coatings/materials into the at least partially interdigitated tiers of the multilayered or multitiered structure(s) prior to, during, or after stacking can be used to modify and/or enhance the thermal transport or thermal resistance properties of the multilayered or multitiered structures resulting from the stacking of the CNT arrays or sheets.

D. Multilayered or Multitiered Structures

In the embodiments described herein, the multilayered or multitiered structures, which can be used as stepped gaskets and shims, are formed by stacking of CNT arrays or sheets are formed by a method including the steps of:

(1) providing at least two or more CNT arrays or sheets; and (2) stacking the at least CNT arrays or sheets wherein the stacking results in at least partial interdigitation of the nanostructures, CNTs, of the arrays or sheets. In some embodiments, the method of making the multilayered or multitiered structures further includes a step of applying or infiltrating a coating, a coating of metallic nanoparticles, and/or a coating of flowable or phase change materials, which are described above. In some embodiments, the step of applying or infiltrating a coating, a coating of metallic nanoparticles, and/or a coating of flowable or phase change materials occurs prior to stacking, alternatively during stacking, or alternatively after stacking. In yet other embodiments, the method includes applying pressure during the stacking step. The applied pressure may be in the range of about 1-100 psi, 1-50 psi, 1-30 psi, more preferably about 1-20 psi, and most preferably about 1-15 psi. In some embodiments, the pressure is about 15 psi. Pressure may be applied continuously until the adjacent tiers are bonded, if a coating material(s) which can act as a bonding agent, such as an adhesive or phase change material, is used. Pressure may be applied for any suitable amount of time. In some embodiments, only a short time is used, such as less than 1 minute, if no bonding agent is used.

At least two CNT arrays or sheets can be stacked to form the multilayered or multitiered structures. For example, FIG. 2 shows stacking of three CNT arrays (right side). By using more CNT arrays the thickness of the multilayered or multitiered structures can be increased as needed. In some embodiments, up to 5, 10, 15, 20, 25, 30, or more CNT arrays or sheets can be stacked according to the method described above. The thickness of the resulting multilayered or multitiered structures formed by stacking can be in the range 1-10,000 microns or more.

In certain embodiments, the multilayered or multitiered structures can be formed by stacking multiple tiers of CNT arrays in a stepped manner, off-set manner, and/or other non-uniform manner in order to be able to conform to complex surfaces.

In a non-limiting embodiment, at least two vertically aligned arrays or sheets formed on supports/substrates are stacked/contacted such that the nanostructure elements, such as CNTs, of the arrays at least partially interdigitate on contact. In one embodiment full interdigitation of nanostructure elements of the arrays occurs within one another when stacked. In other embodiments the arrays may interdigitate only at the tips of the nanostructure elements, such as CNTs. In yet other embodiments, the individual nanostructures can navigate through the nanostructures of the adjacent array during the interdigitating process.

In some embodiments the nanostructures of the stacked arrays, which interdigitate at least partially, may also form into larger superstructures, such as, but not limited to, tube bundles, clumps, or rows. These superstructures may be formed through mechanisms such as capillary clumping or by way of application of a polymer coating prior to, during, or following the stacking process.

In some embodiments, a polymer coating and/or adhesive, or other coating as described above, is applied to the CNT array(s) which are then stacked. In such embodiments, the thickness of the coating and/or adhesive, or other coating as described above, is about 1-1000 nm, more preferable 1-500 nm, and most preferably 1-100 nm.

In certain embodiments of the above method, following the stacking step the method further includes a step of applying an adhesive, such as but not limited to a hot glue or hot melt adhesive that combines wax, tackifiers and a polymer base to the resulting stack to provide improved adhesion properties to one or more surfaces of the stacked/tiered CNT arrays forming the multilayered or multitiered structure. In some embodiments, the adhesive is a pressure sensitive adhesive. In yet other embodiments, the adhesive is a combination of a pressure sensitive adhesive polymer and a thermally activated (or activatable) adhesive polymer which enhances ease of adhesion of a multilayered or multitiered structure described herein which includes such a combination of coatings to a surface(s), by way of the pressure sensitive adhesive and additional and more permanent or semi-permanent adhesion by way of the thermal adhesive.

In yet other embodiments, one or more tiers of the stacked arrays described above may be substituted with other materials to afford a composite stack. Such materials include, but are not limited to, solders, greases, adhesives, phase change materials, gels, heat spreaders, compliant pads, and/or (elastomeric) gap pads. The substitution of these materials for one or more CNT array tiers of the multitiered or multilayered stacks described can be used to further tune the properties of the resulting composite stack. Such composite stacks may be used for a variety of applications described below, such as thermal interface materials (TIMs).

Yet another option is introduce a dielectric material or induce the formation of a dielectric material within the layers/tiers of stacked arrays in order to convert the resulting composite stack from an electrical conductor into an insulator. Dielectric materials are known in the art, such as ceramic insulating materials. As one example, one or more of the substrates of the CNT arrays present in a multitiered stack, which is formed from aluminum, can oxidized (such as by anodization) to produce an electrically insulating stack.

Once prepared according to methods above, the multilayered or multitiered structures can be used as stepped gaskets and shims. The multilayered or multitiered structures can have any suitable shape and dimensions, and thickness for use as a stepped gasket and/or shim. The skilled person can form multilayered or multitiered structures having the desired number of layers (2, 3, 4, or more layers or tiers) to function as a stepped gasket, as required to address the curvature present in the top plate of a thermal interface or joint. The skilled person can also modify multilayered or multitiered structures, as needed, such as to have a particularly desired shape or dimension needed to act as a shim. For example, multilayered or multitiered structures can be made to have an annulus or semi-annulus shape, which may be circular, square, or rectangular. Additionally or alternatively, shims made of multilayered or multitiered structures and having a square or rectangular shape can be prepared.

VII. Applications

The thermal interfaces or joints described above can form part of a device. Such devices, include without limitation, personal computers, server computers, memory modules, graphics chips, radar and radio-frequency (RF) devices, disc drives, displays, including light-emitting diode (LED) displays, lighting systems, automotive control units, power-electronics, solar cells, batteries, communications equipment, such as cellular phones, thermoelectric generators, and imaging equipment, including MRIs.

In certain instances, the thermal interfaces or joints described throughout the specification are useful in low contact pressure and/or low pressure applications. Low pressure may refer to ambient pressure or pressures below 1 atm, such as in the range of about 0.01 to less than about 1 atm. In some instances, low pressure may refer to a vacuum, such as in aerospace applications, where such thermal interfaces or joints could be used in satellites or space vehicles/systems. Under vacuum conditions the thermal interfaces or joints are especially useful because unlike in atmospheric pressure applications where air in the separation gap between plates can contribute to heat transfer, the additional contact points enabled by the stepped gasket can substantially enhance area participating in heat transfer across the joint. Furthermore, the use of thick gaskets to make up contact in space applications can be problematic as the plate deformation that goes along with thick gaskets can result in stresses on potted inserts that can result in the inserts pulling out during the life of the spacecraft. In certain instances, the thermal interfaces or joints described are useful at temperatures which are below ambient temperature, below freezing, or at cryogenic temperatures (such as experienced in space).

The disclosed thermal interfaces and joints and methods of making thereof can be further understood through the following numbered paragraphs.

Paragraph 1. A thermal interface comprising:

first and second plates;

a stepped gasket in between the first and second plates; and one or more fasteners joining the first and the second plates;

wherein at least one of the first and/or the second plates exhibits plate deformation, deflection, or curvature;

wherein the stepped gasket comprises a plurality of layers and there is at least a first base layer and at least a second layer, on top of and in contact with the first base layer, which has a surface area smaller than the surface area of the first base layer; and wherein the at least second layer of the stepped gasket provides at least one or more contact regions with the at least one of the first and/or the second plates exhibiting plate deformation, deflection, or curvature, as compared to a single layer gasket that is not stepped.

Paragraph 2. The thermal interface of paragraph 1, wherein the one or more fasteners join the first and the second plates through one or more holes present on the first and the second plates.

Paragraph 3. The thermal interface of paragraph 1, wherein the first and second plates are independently made of a material selected from the group consisting of aluminum, copper, steel, titanium, zinc, metal matrix composites (such as AlSiC or aluminum-graphite), and metal laminate structures (such as honeycomb panels or fiber metal laminates).

Paragraph 4. The thermal interface of paragraph 1, wherein the first and second plates are independently made of a plastic selected from the group consisting of acrylonitrile butadiene styrene, polycarbonate, nylon, epoxy, glass-reinforced epoxy laminate material (such as FR4), high-pressure fiberglass laminate (such as G10), fiberglass composites, PEEK, polyethylene, polyethylene terephthalate glycol, polypropylene, polyurethane, polyvinyl chloride, polyimide, polytetrafluoroethylene, polylactic acid, PEDOT:PSS (poly(3,4-ethylenedioxythiophene) polystyrene sulfonate), PARA, polyphenylene sulfide, polyamide-imide, and polyetherimide.

Paragraph 5. The thermal interface of paragraph 1, wherein the first and second plates are independently made of a ceramic selected from the group consisting of alumina, aluminum nitride, zirconia, zirconia alumina, beryllium oxide, carbon fiber, graphite, silicon carbide, silicon dioxide, silicon nitride, $Y_2O_3$, TiC, $SrAl_2O_3$, ZrC, HfC, TaC, $ZrB_2$, $HfB_2$, $Mo_2B_5$, $MoSi_2$ TiN, YrN, co-fired ceramics (including high temperature co-fired ceramics (HTCC), low temperature co-fired ceramics (LTCC), ultra low temperature co-fired ceramics (ULTCC), including those consisting of phosphates, silicates, borates, molybdates, vanadates, tellurates and tungstates).

Paragraph 6. The thermal interface of any one of paragraphs 1-5, wherein the first and second plates have a square, rectangular, circular, oval, or ring shape; and wherein the stepped gasket has the same shape as the first and second plates.

Paragraph 7. The thermal interface of any one of paragraphs 1-6, wherein the first and second plates each independently have a thickness in a range of between about 0.5 mm to about 30 mm.

Paragraph 8. The thermal interface of any one of paragraphs 1-7, wherein the first plate is planar or substantially planar and the second plate exhibits plate deformation, deflection, or curvature.

Paragraph 9. The thermal interface of any one of paragraphs 1-8, wherein the one or more fasteners are threaded fasteners, clamps, clips, push pins, rivets, a pneumatic press, a hydraulic press, or combinations thereof.

Paragraph 10. The thermal interface of paragraph 9, wherein the threaded fasteners are bolts and nuts.

Paragraph 11. The thermal interface of paragraph 9, wherein the threaded fasteners are bolts and potted inserts.

Paragraph 12. The thermal interface of any one of paragraphs 1-11, wherein the one or more fasteners are made of a material selected from the group consisting of steel, titanium, aluminum, nylon, brass, bronze, and zinc.

Paragraph 13. The thermal interface of any one of paragraphs 1-12, wherein the plate deformation deflection, or curvature is at a maximum at or near the one or more fasteners joining the first and the second plates.

Paragraph 14. The thermal interface of any one of paragraphs 1-12, wherein the plate deformation, deflection, or curvature is at a maximum at or near the center of the first or the second plates.

Paragraph 15. The thermal interface of any one of paragraphs 1-14, wherein the stepped gasket comprises at least a third layer, on top of and in contact with the second layer, that provides at least one or more additional contact regions with the at least one of the first and/or the second plates exhibiting plate deformation, deflection, or curvature; and the third layer has a surface area smaller than the surface area of the second layer.

Paragraph 16. The thermal interface of paragraph 15, wherein the stepped gasket comprises at least a fourth layer, on top of and in contact with the third layer, that provides at least one or more additional contact regions with the at least one of the first and/or the second plates exhibiting plate deformation, deflection, or curvature; and the fourth layer has a surface area smaller than the surface area of the third layer.

Paragraph 17. The thermal interface of any one of paragraphs 1-16, wherein at least the second layer of the stepped gasket forms at least one, two, three, or four independent contact regions with the at least one of the first and/or the second plates exhibiting plate deformation, deflection, or curvature.

Paragraph 18. The thermal interface of paragraph 15, wherein at least the second layer and/or the third layer of the stepped gasket each independently form at least one, two, three, or four independent contact regions with the at least one of the first and/or the second plates exhibiting plate deformation, deflection, or curvature.

Paragraph 19. The thermal interface of paragraph 16, wherein at least the second layer, the third layer, and/or the fourth layer of the stepped gasket each independently form at least one, two, three, or four independent contact regions with the at least one of the first and/or the second plates exhibiting plate deformation, deflection, or curvature.

Paragraph 20. The thermal interface of paragraph 15, wherein the at least one or more additional contact regions from the second layer and/or the third layer of the stepped gasket to the at least one of the first and/or the second plates exhibiting plate deformation, deflection, or curvature provide an increase in temperature uniformity of the first and/or second plate providing an average thermal conductance across the thermal interface at least 25% higher than that of the same thermal interface with a single layer gasket that is not stepped therein.

Paragraph 21. The thermal interface of paragraph 16, wherein the at least one or more additional contact regions from the second layer, third layer, and/or the fourth layer of the stepped gasket to the at least one of the first and/or the second plates exhibiting plate deformation, deflection, or curvature provide an increase in temperature uniformity of the first and/or second plate providing an average thermal conductance across the thermal interface at least 25% higher than that of the same thermal interface with a single layer gasket that is not stepped therein.

Paragraph 22. The thermal interface of any one of paragraphs 1-21, wherein each of the layers of the stepped gasket independently demonstrates a modulus of elasticity in a range between about 0.1 MPa to about 200 MPa.

Paragraph 23. The thermal interface of any one of paragraphs 1-22, wherein each of the layers of the stepped gasket independently has a thermal interface resistance in a range between about 0.05 $cm^2$-° C./W to about 5 $cm^2$-° C./W.

Paragraph 24. The thermal interface of any one of paragraphs 1-23, wherein each of the layers of the stepped gasket independently has a thickness in a range of between about 50 μm and about 500 μm.

Paragraph 25. The thermal interface of any one of paragraphs 1-23, wherein an increase in height in between layers of the stepped gasket is less than about 500 μm, less than about 250 μm, less than about 150 μm, or less than about 75 μm.

Paragraph 26. The thermal interface of any one of paragraphs 1-25, wherein each of the plurality of layers of the stepped gasket is independently made of a material selected from graphite, carbon fiber, silicone, thermoplastic elastomers, rubber, and acrylic.

Paragraph 27. The thermal interface of paragraph 26, wherein the material further comprises thermally and/or electrically conductive fillers.

Paragraph 28. The thermal interface of any one of paragraphs 1-25, wherein the stepped gasket is made of a multilayered or multitiered structure comprising:

at least a first layer or tier comprising a carbon nanotube array comprising vertically aligned carbon nanotubes grown from opposing surfaces of a first planar substrate, and at least a second layer or tier comprising a carbon nanotube array comprising vertically aligned carbon nanotubes grown from opposing surfaces of a second planar substrate, wherein the at least first layer or tier and the at least second layer or tier are stacked and the vertically aligned carbon nanotubes of the at least first layer or tier at least partially interdigitate the vertically aligned carbon nanotubes of the at least second layer or tier which are interfacing each other.

Paragraph 29. The thermal interface of paragraph 28, wherein the stacked at least first layer or tier and the at least second layer or tier are bonded by a coating material which is an adhesive, a phase change material, or a combination thereof.

Paragraph 30. The thermal interface of paragraph 29, wherein the adhesive is a pressure sensitive adhesive.

Paragraph 31. The thermal interface of any one of paragraphs 1-30, wherein the at least first base layer provides an electrical grounding path through the stepped gasket, preferably near the one or more fasteners.

Paragraph 32. The thermal interface of any one of paragraphs 1-26, wherein the at least first base layer further comprises an adhesive, preferably on a side which is unstacked.

Paragraph 33. The thermal interface of any one of paragraphs 1-32, wherein the at least second layer of the stepped gasket conforms to a surface of the at least one of the first and/or the second plates exhibiting plate deformation, deflection, or curvature at least at the one or more contact regions.

Paragraph 34. The thermal interface of paragraph 15, wherein at least the third layer of the stepped gasket conforms to a surface of the at least one of the first and/or the second plates exhibiting plate deformation, deflection, or curvature at least at the one or more contact regions.

Paragraph 35. The thermal interface of paragraph 16, wherein at least the fourth layer of the stepped gasket conforms to a surface of the at least one of the first and/or the second plates exhibiting plate deformation, deflection, or curvature at least at the one or more contact regions.

Paragraph 36. The thermal interface of any of the paragraphs 1-35 further comprising one or more shims.

Paragraph 37. The thermal interface of paragraph 36, wherein the one or more shims are located around, close to, and/or behind the one or more fasteners present.

Paragraph 38. The thermal interface of any one of paragraphs 36-37, wherein the one or more shims have an annulus or semi-annulus shape which may be circular, square, or rectangular.

Paragraph 39. The thermal interface of paragraph 38, wherein the semi-annulus shaped shim is a ¼, ½, ⅓, or ¾ semi-annulus shaped shim.

Paragraph 40. The thermal interface of paragraph 36, wherein the one or more shims have a square or rectangular shape and are placed around, close to, and/or behind at least one corner, edge, and/or center of the first and/or the second plates.

Paragraph 41. The thermal interface of any one of paragraphs 28-40, wherein the one or more shims are made of a metal foil, preferably aluminum or copper foil.

Paragraph 42. The thermal interface of any one of paragraphs 28-40, wherein the one or more shims are made of a material selected from graphite, carbon fiber, silicone, thermoplastic elastomers, rubber, and acrylic.

Paragraph 43. The thermal interface of any one of paragraphs 28-40, wherein the one or more shims are made of a multilayered or multitiered structure comprising:

at least a first layer or tier comprising a carbon nanotube array comprising vertically aligned carbon nanotubes grown from opposing surfaces of a first planar substrate, and at least a second layer or tier comprising a carbon nanotube array comprising vertically aligned carbon nanotubes grown from opposing surfaces of a second planar substrate, wherein the at least first layer or tier and the at least second layer or tier are stacked and the vertically aligned carbon nanotubes of the at least first layer or tier at least partially interdigitate the vertically aligned carbon nanotubes of the at least second layer or tier which are interfacing each other.

Paragraph 44. The thermal interface of any one of paragraphs 28-43, wherein the one or more shims independently have a thickness in a range of between about 25 μm and about 500 μm.

Paragraph 45. The thermal interface of any one of paragraphs 28-44, wherein the one or more shims independently demonstrate a modulus of elasticity in a range between about 5 MPa to about 130 GPa.

Paragraph 46. A method of fabricating the thermal interface of any one of paragraphs 1-45, the method comprising the steps of:

(1) providing first and second plates;

(2) providing a stepped gasket;

(3) placing the stepped gasket in between the first and the second plates;

(4) joining the first and the second plates with one or more fasteners;

wherein at least one of the first and/or the second plates exhibits plate deformation, deflection, or curvature when joined by the one or more fasteners;

wherein the stepped gasket comprises a plurality of layers and there is at least a first base layer and at least a second layer, on top of and in contact with the first base layer, which has a surface area smaller than the surface area of the first base layer; and wherein the at least second layer of the stepped gasket provides at least one or more contact regions with the at least one of the first and/or the second plates exhibiting plate deformation, deflection, or curvature, as compared to a single layer gasket that is not stepped.

Paragraph 47. The method of paragraph 46, wherein the one or more fasteners join the first and the second plates through one or more holes present on the first and the second plates.

Paragraph 48. The method of paragraph 46, wherein the first and second plates are independently made of a material selected from the group consisting of aluminum, copper, steel, titanium, zinc, metal matrix composites (such as AlSiC or aluminum-graphite), and metal laminate structures (such as honeycomb panels or fiber metal laminates).

Paragraph 49. The method of paragraph 46, wherein the first and second plates are independently made of a plastic selected from the group consisting of acrylonitrile butadiene styrene, polycarbonate, nylon, epoxy, glass-reinforced epoxy laminate material (such as FR4), high-pressure fiberglass laminate (such as G10), fiberglass composites, PEEK, polyethylene, polyethylene terephthalate glycol, polypropylene, polyurethane, polyvinyl chloride, polyimide, polytetrafluoroethylene, polylactic acid, PEDOT:PSS (poly(3,4-ethylenedioxythiophene) polystyrene sulfonate), PARA, polyphenylene sulfide, polyamide-imide, and polyetherimide.

Paragraph 50. The method of paragraph 46, wherein the first and second plates are independently made of a ceramic selected from the group consisting of alumina, aluminum nitride, zirconia, zirconia alumina, beryllium oxide, carbon fiber, graphite, silicon carbide, silicon dioxide, silicon nitride, $Y_2O_3$, TiC, $SrAl_2O_3$, ZrC, HfC, TaC, $ZrB_2$, $HfB_2$, $Mo_2B_5$, $MoSi_2$ TiN, YrN, co-fired ceramics (including high temperature co-fired ceramics (HTCC), low temperature co-fired ceramics (LTCC), ultra low temperature co-fired ceramics (ULTCC), including those consisting of phosphates, silicates, borates, molybdates, vanadates, tellurates and tungstates).

Paragraph 51. The method of any one of paragraphs 46-50, wherein the first and second plates have a square, rectangular, circular, oval, or ring shape; and wherein the stepped gasket has the same shape as the first and second plates.

Paragraph 52. The method of any one of paragraphs 46-51, wherein the first and second plates each independently have a thickness in a range of between about 0.5 mm to about 30 mm.

Paragraph 53. The method of any one of paragraphs 46-52, wherein the one or more fasteners are threaded fasteners, clamps, clips, push pins, rivets, a pneumatic press, a hydraulic press, or combinations thereof.

Paragraph 54. The method of paragraph 53, wherein the threaded fasteners are bolts and nuts.

Paragraph 55. The method of paragraph 53, wherein the threaded fasteners are bolts and potted inserts.

Paragraph 56. The method of any one of paragraphs 46-55, wherein the one or more fasteners are made of a material selected from the group consisting of steel, titanium, aluminum, nylon, brass, bronze, and zinc.

Paragraph 57. The method of any one of paragraphs 46-56, wherein the stepped gasket comprises at least a third layer, on top of and in contact with the second layer, that provides at least one or more additional contact regions with the at least one of the first and/or the second plates exhibiting plate deformation, deflection, or curvature; and the third layer has a surface area smaller than the surface area of the second layer.

Paragraph 58. The method of paragraph 57, wherein the stepped gasket comprises at least a fourth layer, on top of and in contact with the third layer, that provides at least one or more additional contact regions with the at least one of the first and/or the second plates exhibiting plate deformation, deflection, or curvature; and the fourth layer has a surface area smaller than the surface area of the third layer.

Paragraph 59. The method of any one of paragraphs 46-58, wherein each of the plurality of layers of the stepped gasket independently has a thickness in a range of between about 50 μm and about 500 μm.

Paragraph 60. The method of any one of paragraphs 46-59, wherein each of the plurality of layers of the stepped gasket is independently made of a material selected from graphite, carbon fiber, silicone, thermoplastic elastomers, rubber, and acrylic.

Paragraph 61. The method of any one of paragraphs 46-59, wherein the stepped gasket is made of a multilayered or multitiered structure comprising:

at least a first layer or tier comprising a carbon nanotube array comprising vertically aligned carbon nanotubes grown from opposing surfaces of a first planar substrate, and at least a second layer or tier comprising a carbon nanotube array comprising vertically aligned carbon nanotubes grown from opposing surfaces of a second planar substrate, wherein the at least first layer or tier and the at least second layer or tier are stacked and the vertically aligned carbon nanotubes of the at least first layer or tier at least partially interdigitate the vertically aligned carbon nanotubes of the at least second layer or tier which are interfacing each other.

Paragraph 62. The method of paragraph 61, wherein the stacked at least first layer or tier and the at least second layer or tier are bonded by a coating material which is an adhesive, a phase change material, or a combination thereof.

Paragraph 63. The method of paragraph 62, wherein the adhesive is a pressure sensitive adhesive.

Paragraph 64. The method of any of the paragraphs 46-63, wherein the method further comprises a step of placing one or more shims between the first and the second plates prior to step (4).

Paragraph 65. The method of paragraph 64, wherein the one or more shims are placed around, close to, and/or behind the one or more fasteners present.

Paragraph 66. The method of any one of paragraphs 64-65, wherein the one or more shims have an annulus or semi-annulus shape which may be circular, square, or rectangular.

Paragraph 67. The method of paragraph 66, wherein the semi-annulus shaped shim is a ¼, ½, ⅓, or ¾ semi-annulus shaped shim.

Paragraph 68. The method of paragraph 64, wherein the one or more shims have a square or rectangular shape and are placed around, close to, and/or behind at least one corner, edge, and/or center of the first and/or the second plates.

Paragraph 69. The method of any one of paragraphs 64-68, wherein the one or more shims are made of a metal foil, preferably aluminum or copper foil.

Paragraph 70. The method of any one of paragraphs 64-68, wherein the one or more shims are made of a material selected from graphite, carbon fiber, silicone, thermoplastic elastomers, rubber, and acrylic.

Paragraph 71. The method of any one of paragraphs 64-68, wherein the one or more shims are made of a multilayered or multitiered structure comprising:

at least a first layer or tier comprising a carbon nanotube array comprising vertically aligned carbon nanotubes grown from opposing surfaces of a first planar substrate, and at least a second layer or tier comprising a carbon nanotube array comprising vertically aligned carbon nanotubes grown from opposing surfaces of a second planar substrate, wherein the at least first layer or tier and the at least second layer or tier are stacked and the vertically aligned carbon nanotubes of the at least first layer or tier at least partially interdigitate the vertically aligned carbon nanotubes of the at least second layer or tier which are interfacing each other.

Paragraph 72. The method of any one of paragraphs 64-71, wherein the one or more shims independently have a thickness in a range of between about 25 μm and about 500 μm.

Paragraph 73. The method of any one of paragraphs 64-72, wherein the one or more shims independently demonstrate a modulus of elasticity in a range between about 5 MPa to about 130 GPa.

Paragraph 74. A thermal interface comprising:

first and second plates;

a single layer gasket in between the first and second plates; and one or more fasteners joining the first and the second plates;

wherein at least one of the first and/or the second plates exhibits plate deformation, deflection, or curvature;

wherein one or more shims are present around, close to, and/or behind the one or more fasteners to reduce and/or mitigate the deformation, deflection, or curvature of the first and/or the second plates.

Paragraph 75. The thermal interface of paragraph 74, wherein the one or more fasteners join the first and the second plates through one or more holes present on the first and the second plates.

Paragraph 76. The thermal interface of paragraph 74, wherein the first and second plates are independently made of a material selected from the group consisting of aluminum, copper, steel, titanium, zinc, metal matrix composites (such as AlSiC or aluminum-graphite), and metal laminate structures (such as honeycomb panels or fiber metal laminates).

Paragraph 77. The thermal interface of paragraph 74, wherein the first and second plates are independently made of a plastic selected from the group consisting of acrylonitrile butadiene styrene, polycarbonate, nylon, epoxy, glass-reinforced epoxy laminate material (such as FR4), high-pressure fiberglass laminate (such as G10), fiberglass composites, PEEK, polyethylene, polyethylene terephthalate glycol, polypropylene, polyurethane, polyvinyl chloride, polyimide, polytetrafluoroethylene, polylactic acid, PEDOT:PSS (poly(3,4-ethylenedioxythiophene) polystyrene sulfonate), PARA, polyphenylene sulfide, polyamide-imide, and polyetherimide.

Paragraph 78. The thermal interface of paragraph 74, wherein the first and second plates are independently made of a ceramic selected from the group consisting of alumina, aluminum nitride, zirconia, zirconia alumina, beryllium oxide, carbon fiber, graphite, silicon carbide, silicon dioxide, silicon nitride, $Y_2O_3$, TiC, $SrAl_2O_3$, ZrC, HfC, TaC, $ZrB_2$, $HfB_2$, $Mo_2B_5$, $MoSi_2$ TiN, YrN, co-fired ceramics (including high temperature co-fired ceramics (HTCC), low temperature co-fired ceramics (LTCC), ultra low temperature co-fired ceramics (ULTCC), including those consisting of phosphates, silicates, borates, molybdates, vanadates, tellurates and tungstates).

Paragraph 79. The thermal interface of any one of paragraphs 74-78, wherein the first and second plates have a square, rectangular, circular, oval, or ring shape.

Paragraph 80. The thermal interface of any one of paragraphs 74-79, wherein the first and second plates each independently have a thickness in a range of between about 0.5 mm to about 30 mm.

Paragraph 81. The thermal interface of any one of paragraphs 74-80, wherein the first plate is planar or substantially planar and the second plate exhibits plate deformation, deflection, or curvature.

Paragraph 82. The thermal interface of any one of paragraphs 74-81, wherein the one or more fasteners are threaded fasteners, clamps, clips, push pins, rivets, a pneumatic press, a hydraulic press, or combinations thereof.

Paragraph 83. The thermal interface of paragraph 82, wherein the threaded fasteners are bolts and nuts.

Paragraph 84. The thermal interface of paragraph 82, wherein the threaded fasteners are bolts and potted inserts.

Paragraph 85. The thermal interface of any one of paragraphs 74-84, wherein the one or more fasteners are made of a material selected from the group consisting of steel, titanium, aluminum, nylon, brass, bronze, and zinc.

Paragraph 86. The thermal interface of any one of paragraphs 74-85, wherein the plate deformation, deflection, or curvature is at a maximum at or near the one or more fasteners joining the first and the second plates.

Paragraph 87. The thermal interface of any one of paragraphs 74-86, wherein the plate deformation, deflection, or curvature is at a maximum at or near the center of the first or the second plates.

Paragraph 88. The thermal interface of any one of paragraphs 74-87, wherein the one or more shims increase average thermal conductance across the thermal interface by least about 25% more than that of the same thermal interface without shims present.

Paragraph 89. The thermal interface of any one of paragraphs 74-88, wherein the one or more shims are located around, close to, and/or behind the one or more fasteners present.

Paragraph 90. The thermal interface of any one of paragraphs 74-89, wherein the one or more shims have an annulus or semi-annulus shape which may be circular, square, or rectangular.

Paragraph 91. The thermal interface of paragraph 90, wherein the semi-annulus shaped shim is a ¼, ½, ⅓, or ¾ semi-annulus shaped shim.

Paragraph 92. The thermal interface of any one of paragraphs 74-89, wherein the one or more shims have a square or rectangular shape and are placed around, close to, and/or behind at least one corner, edge, and/or center of the first and/or the second plates.

Paragraph 93. The thermal interface of any one of paragraphs 74-92, wherein the one or more shims are made of a metal foil, preferably aluminum or copper foil.

Paragraph 94. The thermal interface of any one of paragraphs 74-93, wherein the one or more shims are made of a material selected from graphite, carbon fiber, silicone, thermoplastic elastomers, rubber, and acrylic.

Paragraph 95. The thermal interface of any one of paragraphs 74-93, wherein the one or more shims are made of a multilayered or multitiered structure comprising:

at least a first layer or tier comprising a carbon nanotube array comprising vertically aligned carbon nanotubes grown from opposing surfaces of a first planar substrate, and at least a second layer or tier comprising a carbon nanotube array comprising vertically aligned carbon nanotubes grown from opposing surfaces of a second planar substrate, wherein the at least first layer or tier and the at least second layer or tier are stacked and the vertically aligned carbon nanotubes of the at least first layer or tier at least partially interdigitate the vertically aligned carbon nanotubes of the at least second layer or tier which are interfacing each other.

Paragraph 96. The thermal interface of any one of paragraphs 74-95, wherein the one or more shims independently have a thickness in a range of between about 25 μm and about 500 μm.

Paragraph 97. The thermal interface of any one of paragraphs 74-96, wherein the one or more shims independently demonstrate a modulus of elasticity in a range between about 5 MPa to about 130 GPa.

Paragraph 98. A method of fabricating the thermal interface of any one of paragraphs 74-97, the method comprising the steps of:

(1) providing first and second plates;

(2) providing a single layer gasket;

(3) placing the single layer gasket in between the first and the second plates;

(4) placing one or more shims in between the first and the second plates; and (5) joining the first and the second plates with one or more fasteners;

wherein at least one of the first and/or the second plates exhibits plate deformation, deflection, or curvature when joined by the one or more fasteners;

wherein one or more shims are present around, close to, and/or behind the one or more fasteners to reduce and/or mitigate the deformation, deflection, or curvature of the first and/or the second plates.

Paragraph 99. The method of paragraph 98, wherein the one or more fasteners join the first and the second plates through one or more holes present on the first and the second plates.

Paragraph 100. The method of paragraph 98, wherein the first and second plates are independently made of a material selected from the group consisting of aluminum, copper, steel, titanium, zinc, metal matrix composites (such as AlSiC or aluminum-graphite), and metal laminate structures (such as honeycomb panels or fiber metal laminates).

Paragraph 101. The method of paragraph 98, wherein the first and second plates are independently made of a plastic selected from the group consisting of acrylonitrile butadiene styrene, polycarbonate, nylon, epoxy, glass-reinforced epoxy laminate material (such as FR4), high-pressure fiberglass laminate (such as G10), fiberglass composites, PEEK, polyethylene, polyethylene terephthalate glycol, polypropylene, polyurethane, polyvinyl chloride, polyimide, polytetrafluoroethylene, polylactic acid, PEDOT:PSS (poly(3,4-ethylenedioxythiophene) polystyrene sulfonate), PARA, polyphenylene sulfide, polyamide-imide, and polyetherimide.

Paragraph 102. The method of paragraph 98, wherein the first and second plates are independently made of a ceramic selected from the group consisting of alumina, aluminum nitride, zirconia, zirconia alumina, beryllium oxide, carbon fiber, graphite, silicon carbide, silicon dioxide, silicon nitride, $Y_2O_3$, TiC, $SrAl_2O_3$, ZrC, HfC, TaC, $ZrB_2$, $HfB_2$, $Mo_2B_5$, $MoSi_2$ TiN, YrN, co-fired ceramics (including high temperature co-fired ceramics (HTCC), low temperature co-fired ceramics (LTCC), ultra low temperature co-fired ceramics (ULTCC), including those consisting of phosphates, silicates, borates, molybdates, vanadates, tellurates and tungstates).

Paragraph 103. The method of any one of paragraphs 98-102, wherein the first and second plates have a square, rectangular, circular, oval, or ring shape.

Paragraph 104. The method of any one of paragraphs 98-103, wherein the first and second plates each independently have a thickness in a range of between about 0.5 mm to about 30 mm.

Paragraph 105. The method of any one of paragraphs 98-104, wherein the one or more fasteners are threaded fasteners, clamps, clips, push pins, rivets, a pneumatic press, a hydraulic press, or combinations thereof.

Paragraph 106. The method of paragraph 105, wherein the threaded fasteners are bolts and nuts.

Paragraph 107. The method of paragraph 105, wherein the threaded fasteners are bolts and potted inserts.

Paragraph 108. The method of any one of paragraphs 98-107, wherein the one or more fasteners are made of a material selected from the group consisting of steel, titanium, aluminum, nylon, brass, bronze, and zinc.

Paragraph 109. The method of any one of paragraphs 98-108, wherein the one or more shims are placed around, close to, and/or behind the one or more fasteners present.

Paragraph 110. The method of any one of paragraphs 98-109, wherein the one or more shims have an annulus or semi-annulus shape which may be circular, square, or rectangular.

Paragraph 111. The method of paragraph 110, wherein the semi-annulus shaped shim is a ¼, ½, ⅓, or ¾ semi-annulus shaped shim Paragraph 112. The method of any one of paragraphs 98-109, wherein the one or more shims have a square or rectangular shape and are placed around, close to, and/or behind at least one corner, edge, and/or center of the first and/or the second plates.

Paragraph 113. The method of any one of paragraphs 98-112, wherein the one or more shims are made of a metal foil, preferably aluminum or copper foil.

Paragraph 114. The method of any one of paragraphs 98-112, wherein the one or more shims are made of a material selected from graphite, carbon fiber, silicone, thermoplastic elastomers, rubber, and acrylic.

Paragraph 115. The method of any one of paragraphs 98-112, wherein the one or more shims are made of a multilayered or multitiered structure comprising:

at least a first layer or tier comprising a carbon nanotube array comprising vertically aligned carbon nanotubes grown from opposing surfaces of a first planar substrate, and at least a second layer or tier comprising a carbon nanotube array comprising vertically aligned carbon nanotubes grown from opposing surfaces of a second planar substrate, wherein the at least first layer or tier and the at least second layer or tier are stacked and the vertically aligned carbon nanotubes of the at least first layer or tier at least partially interdigitate the vertically aligned carbon nanotubes of the at least second layer or tier which are interfacing each other.

Paragraph 116. The method of any one of paragraphs 98-115, wherein the one or more shims independently have a thickness in a range of between about 25 μm and about 500 μm.

Paragraph 117. The method of any one of paragraphs 98-116, wherein the one or more shims independently demonstrate a modulus of elasticity in a range between about 5 MPa to about 130 GPa.

Paragraph 118. A device comprising the thermal interface of any one of paragraphs 1-45 or 74-97.

Paragraph 119. The device of paragraph 118, wherein the device is selected from the group consisting of personal computers, server computers, memory modules, graphics chips, radar and radio-frequency (RF) devices, disc drives, displays, including light-emitting diode (LED) displays, lighting systems, automotive control units, power-electronics, solar cells, batteries, communications equipment, such as cellular phones, thermoelectric generators, and imaging equipment.

Paragraph 120. The device of paragraph 119, wherein the device is an aerospace device selected from satellites, space vehicles, or space systems operating under vacuum.

EXAMPLES

Example 1. Thermal Interfaces Containing Stepped Gaskets

Materials and Methods

Test Samples

Gaskets used were acquired from Carbice® Corporation. The gaskets consist of a vertically aligned carbon nanotube array grown on 50 μm aluminum foil and encapsulated in silicone. The thicknesses of the gasket products used were 65 μm and 125 μm with compressive modulus of elasticity estimated at about 18 and 35 MPa, respectively. The modulus of elasticity was calculated from stress-strain data that was collected using a Precision Thickness Gauge (Hanatek Instruments) under loads varying from 0.2 to 1.4 MPa.

In addition, stepped gaskets were prepared from the single layer 65 μm and 125 μm gaskets by stacking the gaskets. Accordingly, 1, 2, 3, and 4 layer gaskets were studied, as follows:

1 layer (single layer gasket): 500 μm
1 layer (single layer gasket): 125 μm 2 layers (stepped gasket): 125 μm (base layer) and 65 μm (layer #3 in Table 1 below)

3 layers (stepped gasket): 125 μm and 2×(65 μm-layers #2  in Table 1 below)

4 layers (stepped gasket): 125 μm and 3×(65 μm layers #2, #3, and #4 in Table 1 below)

The dimensions of these layers, as described above, are given in Table 1 below.

TABLE 1

| Layer | Thickness | Size (mm) | |
| | | X | Y |
| --- | --- | --- | --- |
| #1 | 125 μm | 364 | 516 |
| #2 | 65 μm | 228 | 360 |
| #3 | 65 μm | 156 | 240 |
| #4 | 65 μm | 70 | 108 |
| #1 | 500 μm | 364 | 516 |

Thermal Conductance Properties of Samples

Figure 7:
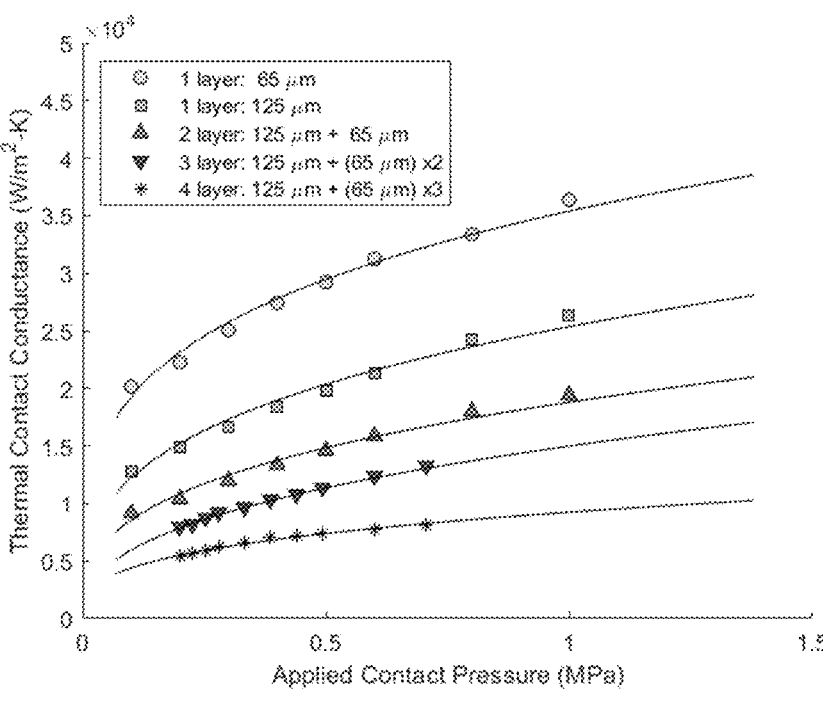
FIG. 7 is a graph of the experimental thermal conductance data as a function of applied contact pressure for gaskets of varying numbers of layers (1, 2, 3, and 4). Best-fit power law correlations were overlaid for each data set.

The thermal properties of the single and stepped gaskets were recorded for each sample thickness, as well as for each multilayered sample combination studied. 1 cm×1 cm samples were measured in a modified ASTM-D5470 stepped bar apparatus to record 1D steady state thermal contact resistance (inverse of conductance). The relationship between applied contact pressure and conductance approximately follows a power law correlation, which was uniquely fitted to each gasket sample and multilayer combination used in this study (see FIG. 7). These pressure-conductance relations are used to correlate the deflection-based gasket pressure distribution in bolted joint predictions into spatial distribution of thermal contact conductance.

Stepped Gasket Selection and Solution Determination

To achieve conformal contact with plate surfaces, stepped gaskets having a pyramidal/stepped formation were studied, as discussed above. The parameters of interest were the number of gasket layers in the tiered/stacked formation, the thickness of each tier, and the precise positioning of each layer. For a given bolted joint configuration, various combinations of these parameters were studied in the numerical approach outlined below that would give the best thermal performance.

Since these studies incorporate a selection of commercially available single layer gasket materials, the height selection was constrained to combinations of 65 μm material layers. Though it was found that using a thicker base layer of 125 μm provided for easier handling and assembly without significantly affecting thermal performance The precise positioning of each layer was a factor that affected the resulting contact through the entire stepped gasket. Thus, due to the complexity and sensitivity of the stepped gaskets, there was evidence of diminishing returns beyond a two-tiered gasket. Nevertheless, use of three or even four layers can be useful depending on circumstances.

Once the multi-tier/layer structure was determined for a given bolted joint configuration, each gasket layer was laser cut to size from large sheets of material and assembled layer by layer.

Numerical Modeling of Bolted Joint Deflection

The deflection characteristics of bolted joints (or interfaces) that incorporate stepped gaskets was numerically modeled to assess the effect of gasket layer and position on the interface contact and thermal performance. First, perimeter-bolted plates were examined and approximated as Euler-Bernoulli beams with the thin gasket layer(s) between mating surfaces treated as a compressive elastic foundation. Classical beam theory then gives the following equation:

$$D\frac{d^4 w(x)}{dx^4} = p(x) \tag{1}$$

where w is the deflection of the beam and $D=Et^3/12$ is the flexural rigidity of the beam according to thickness, t, and the elastic modulus of the beam, E. p(x) is the distributed load which incorporates both the applied load in the vicinity of the bolts as well as the reaction force of the gasket under compression, $p_g(x)$. Following Hooke's Law, this reaction pressure exerted by a single layer of compressed gasket is $p_g(x)=\kappa_g w(x)$ for $w(x)<0$ and $q_g=0$ otherwise (in separation). Here the gasket stiffness is known from the measured sample properties by $\kappa_g=E_g/t_g$. For a stepped gasket comprising multiple stepped layers, the equivalent stiffness used for calculation in the multilayer region is calculated by the reduced sum of the stiffness constants for the individual layers.

The predicted deflection of the bolted joints was calculated by numerically solving Eq. (1) while iteratively determining regions of gasket compression versus separation. The deflection characteristics provided a picture of the pressure distribution of the compressed gasket, which, according to the correlations highlighted in FIG. 7, allow estimation of the thermal contact conductance distribution afforded by the gasket through the bolted interface. The compression of the gasket can be extracted from this beam position data, which can then be used, along with measured values of modulus and thermal conductance, to output the pressure and subsequently the local thermal contact conductance of the gasket.

Experimental Methods of Contact and Conductance in Bolted Joints

Figure 8:
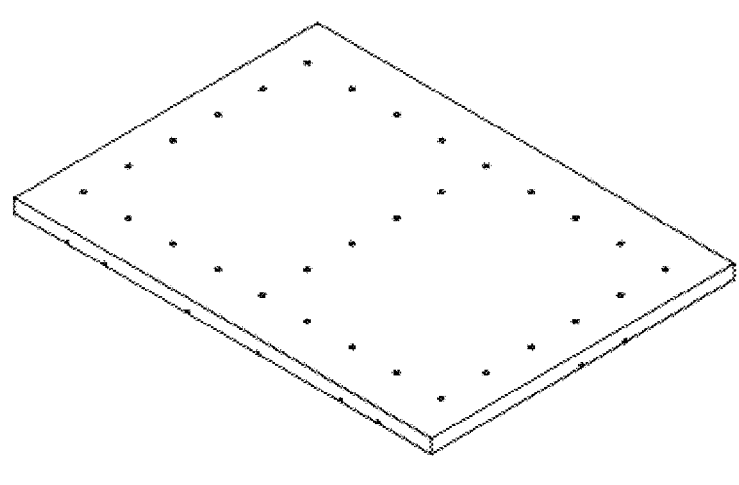
FIG. 8 is a non-limiting representation of a 50 cm×36 cm, 18 mm thick plate demonstrating a 22 bolt hole configuration.

The general setup for measuring thermal conductance in bolted joints consisted of a stepped or single-layer gasket sandwiched between a cold base plate and a heated top plate. A representative case was used to study conditions in which the plate deformation was severe enough to warrant a stepped gasket to enhance contact and thermal performance; see FIG. 8: a 50 cm×36 cm plate size, 18 mm plate thickness, 26 bolt configuration. The thickness of the top plate is selected to represent bending stiffness on par with a honeycomb panel like those commonly used in spacecraft builds.

The thick aluminum base plate was cooled by a steady flow of cold water circulated through a chiller at −30-25° C. Different gaskets, as described above, were applied with a soft rubber roller to adhere smoothly to the interface. The top plate was fitted with one or more ceramic heaters to supply a surface heat flux on the order of about 1 W/cm². Pairs of thermocouples were mounted in grooves at corresponding locations along the hot and cold plates to measure the interfacial temperature difference. Several pairs of thermocouples were distributed along the plate area at strategic locations in order to map the temperature gradient across the interface surface. Approximate temperature contours were later generated via 2D interpolation of these thermocouple data points. Approximate temperature contours were later generated via 2D interpolation of these thermocouple data points. These experiments were conducted in vacuum at a target pressure of $1\times10^{-6}$ torr.

Calculation of Thermal Contact Conductance

From the steady-state measurements, thermal contact conductance, $h_c$, and the thermal contact resistance, R, can be obtained at each thermocouple location through $$h_c = \frac{1}{R} = \frac{q''}{T_H - T_C}$$

where q" is the average heat flux over the plate surface based off of the total heat production by the ceramic heaters mounted on the top plate surface. Unless otherwise noted, average thermal contact conductance for the interface is then estimated by averaging the local h calculated at each thermocouple location.

Contact Measurements Using Pressure Sensitive Film

To assess the regions of contact between the bolted joint surfaces and the gaskets, pressure sensitive film was used (Extreme Low, Fujifilm Prescale Pressure Indicating Film).

Results and Discussion

Verification of Deflection Model Contact Prediction for Single and Double-Layer Gaskets Model predictions of beam contact versus separation were initially verified using pressure-sensitive film (not shown). When observing the coloring of the pressure maps, the contact matched predictions. As predicted, contact was achieved in the second layer gasket.

The first layer of the gasket was 125 μm in height. Using pressure sensitive film to reveal where the top plate/beam made contact with the gasket the region of contact near each bolt for this single-layer control test was found to be ~33 mm±2 mm. Then a second layer was placed atop to form a stepped gasket. The second layer was 65 μm in height, and positioned to conform to the predicted curvature of the beam. The contact measured for the stepped gasket was 28 mm near each bolt (the first layer of stepped gasket), and an additional 10 mm at each edge of the 2nd layer of gasket. Therefore, the total area of contact was thereby found to increase by 15% through the use of a stepped gasket, as opposed to a single-layer gasket. Moreover, the fact that the contact was more distributed along the length of the beam (as opposed to being localized near the bolts) has a more pronounced impact on spreading resistance, which has a significant effect on full interface thermal conductance.

The two layered case had a 33% increase in average thermal conductance as compared to the single layer case (1,064 versus 802 W/m²-° C.). Thus, use of stepped gaskets serve to both increase contact area and better distribute the contact area. The more even distribution of interfacial contact is advantageous due to the effects of interplanar heat spreading resistance and the better distribution also results in the reduction of hot spots at thermal interfaces where stepped gaskets are used.

Beyond the single layer gasket control and two layered stepped gaskets discussed above, three layered and four layered stepped gaskets test cases were also studied. In these cases, enhanced contact is realized which translated to an overall improvement in contact conductance of 19% (957 W/m²-° C.). and 52% (1220 W/m²-° C.) as compared to the single layer gasket (802 W/m²-° C.). The three-layer gasket did not show as high of a conductance increase as the other cases, possibly owed to a lack of contact or proper alignment of the tiers in that case.

Temperature contour maps showed qualitative agreement between ANSYS simulations performed (not shown) and stepped gaskets tested and measured in a vacuum chamber testing. Vacuum testing was conducted in an evacuated chamber at pressures below 1 μTorr. ANSYS predicted conductance correlates with measured thermal performance

CONCLUSIONS

The studies described above show that a multilayered structuring to afford stepped gaskets can be used in thermal interfaces to enhance interface thermal conductance, such as in bolted joints where plates exhibit deflection and deformation. To address the issue of plate deflection/deformation, it was shown that a stepped gasket could better conform to the naturally deflected plate curvature. Thus, the of a stepped gasket allows for enhance of gasket contact and improvement of thermal contact conductance at the interface, such as in bolted joints. The deflection behavior of bolted joints was modeled using Euler-Bernoulli beam theory and the model was then used to predict the deflection under structured/tiered gaskets and optimize the geometry stepped gaskets. Experiments were found to match model predictions. Based on conductance studies and it was shown that thermal conductance could be improved by up to 52% due to the introduction of as many as 3 additional layers (in the form of stepped gaskets), as compared to a single-layer gasket.

Unless defined otherwise, all technical and scientific terms used herein have the same meanings as commonly understood by one of skill in the art to which the disclosed invention belongs. Publications cited herein and the materials for which they are cited are specifically incorporated by reference.

Those skilled in the art will recognize, or be able to ascertain using no more than routine experimentation, many equivalents to the specific embodiments of the invention described herein. Such equivalents are intended to be encompassed by the following claims.

We claim:

1. A thermal interface comprising:
first and second plates;
a stepped gasket in between the first and second plates; and
one or more fasteners joining the first and the second plates;
wherein at least one of the first and/or the second plates exhibits plate deformation, deflection, or curvature;
wherein the stepped gasket comprises a plurality of independent layers and there is at least a first base layer and at least a second layer, stacked on top of and in contact with the first base layer, which has a surface area smaller than the surface area of the first base layer;
wherein the at least second layer of the stepped gasket provides at least one or more contact regions with the at least one of the first and/or the second plates exhibiting plate deformation, deflection, or curvature, as compared to a single layer gasket that is not stepped; and
wherein each of the plurality of independent layers of the stepped gasket is independently made of a material selected from graphite, carbon fiber, silicone, thermoplastic elastomers, rubber, and acrylic; or wherein the first base layer comprises a carbon nanotube array comprising vertically aligned carbon nanotubes grown from opposing surfaces of a first planar substrate and the at least second layer comprises a carbon nanotube array comprising vertically aligned carbon nanotubes grown from opposing surfaces of a second planar substrate and wherein the vertically aligned carbon nanotubes of the first base layer at least partially interdigitate the vertically aligned carbon nanotubes of the second layer which are interfacing each other.

2. The thermal interface of claim 1, wherein the one or more fasteners join the first and the second plates through one or more holes present on the first and the second plates.

3. The thermal interface of claim 1, wherein the first and second plates are independently made of a material selected from the group consisting of aluminum, copper, steel, titanium, zinc, metal matrix composites, and metal laminate structures; or the first and second plates are independently made of a plastic selected from the group consisting of acrylonitrile butadiene styrene, polycarbonate, nylon, epoxy, glass-reinforced epoxy laminate material, high-pressure fiberglass laminate, fiberglass composites, PEEK, polyethylene, polyethylene terephthalate glycol, polypropylene, polyurethane, polyvinyl chloride, polyimide, polytetrafluoroethylene, polylactic acid, PEDOT:PSS (poly(3,4-ethylenedioxythiophene) polystyrene sulfonate), PARA, polyphenylene sulfide, polyamide-imide, and polyetherimide; or the first and second plates are independently made of a ceramic selected from the group consisting of alumina, aluminum nitride, zirconia, zirconia alumina, beryllium oxide, carbon fiber, graphite, silicon carbide, silicon dioxide, silicon nitride, $Y_2O_3$, TiC, $SrAl_2O_3$, ZrC, HfC, TaC, $ZrB_2$, $HfB_2$, $Mo_2B_5$, $MoSi_2$ TiN, YrN, and co-fired ceramics.

4. The thermal interface of claim 1, wherein the first and second plates have a square, rectangular, circular, oval, or ring shape; and
wherein the stepped gasket has the same shape as the first and second plates.

5. The thermal interface of claim 1, wherein the first and second plates each independently have a thickness in a range of between about 0.5 mm to about 30 mm.

6. The thermal interface of claim 1, wherein the one or more fasteners are threaded fasteners, clamps, clips, push pins, rivets, a pneumatic press, a hydraulic press, or combinations thereof.

7. The thermal interface of claim 6, wherein the threaded fasteners are bolts and nuts; or the threaded fasteners are bolts and potted inserts.

8. The thermal interface of claim 1, wherein the one or more fasteners are made of a material selected from the group consisting of steel, titanium, aluminum, nylon, brass, bronze, and zinc.

9. The thermal interface of claim 1, wherein the stepped gasket comprises at least a third layer, on top of and in contact with the second layer, that provides at least one or more additional contact regions with the at least one of the first and/or the second plates exhibiting plate deformation, deflection, or curvature; and the third layer has a surface area smaller than the surface area of the second layer.

10. The thermal interface of claim 9, wherein the stepped gasket comprises at least a fourth layer, on top of and in contact with the third layer, that provides at least one or more additional contact regions with the at least one of the first and/or the second plates exhibiting plate deformation, deflection, or curvature; and the fourth layer has a surface area smaller than the surface area of the third layer.

11. The thermal interface of claim 10, wherein at least the second layer, the third layer, and/or the fourth layer of the stepped gasket each independently form at least one, two, three, or four independent contact regions with the at least one of the first and/or the second plates exhibiting plate deformation, deflection, or curvature.

12. The thermal interface of claim 10, wherein the at least one or more additional contact regions from the second layer, third layer, and/or the fourth layer of the stepped gasket to the at least one of the first and/or the second plates exhibiting plate deformation, deflection, or curvature provide an increase in temperature uniformity of the first and/or second plate providing an average thermal conductance across the thermal interface at least 25% higher than that of the same thermal interface with a single layer gasket that is not stepped therein.

13. The thermal interface of claim 9, wherein at least the second layer and/or the third layer of the stepped gasket each independently form at least one, two, three, or four independent contact regions with the at least one of the first and/or the second plates exhibiting plate deformation, deflection, or curvature.

14. The thermal interface of claim 9, wherein the at least one or more additional contact regions from the second layer and/or the third layer of the stepped gasket to the at least one of the first and/or the second plates exhibiting plate deformation, deflection, or curvature provide an increase in temperature uniformity of the first and/or second plate providing an average thermal conductance across the thermal interface at least 25% higher than that of the same thermal interface with a single layer gasket that is not stepped therein.

15. The thermal interface of claim 1, wherein at least the second layer of the stepped gasket forms at least one, two, three, or four independent contact regions with the at least one of the first and/or the second plates exhibiting plate deformation, deflection, or curvature.

16. The thermal interface of claim 1, wherein the at least one or more additional contact regions from the second layer of the stepped gasket to the at least one of the first and/or the second plates exhibiting plate deformation, deflection, or curvature provide an increase in temperature uniformity of the first and/or second plate providing an average thermal conductance across the thermal interface at least 25% higher than that of the same thermal interface with a single layer gasket that is not stepped therein.

17. The thermal interface of claim 1, wherein each of the independent layers of the stepped gasket independently demonstrates: a modulus of elasticity in a range between about 0.1 MPa to about 200 MPa; and/or
wherein each of the independent layers of the stepped gasket independently has a thermal interface resistance in a range between about 0.05 cm$^2$-° C./W to about 5 cm$^2$-° C./W.

18. The thermal interface of claim 1, wherein each of the independent layers of the stepped gasket independently has a thickness in a range of between about 50 μm and about 500 μm.

19. The thermal interface of claim 1, wherein an increase in height in between layers of the stepped gasket is less than about 500 μm, less than about 250 μm, less than about 150 μm, or less than about 75 μm.

20. The thermal interface of claim 1, wherein the material is selected from graphite, carbon fiber, silicone, rubber, and acrylic; and the material optionally further comprises thermally and/or electrically conductive fillers.

21. The thermal interface of claim 1 further comprising one or more shims.

22. The thermal interface of claim 21, wherein the one or more shims are located around, close to, and/or behind the one or more fasteners present.

23. The thermal interface of claim 21, wherein the one or more shims have an annulus or semi-annulus shape which may be circular, square, or rectangular.

24. The thermal interface of claim 21, wherein the one or more shims are made of a metal foil; or wherein the one or more shims are made of a material selected from graphite, carbon fiber, silicone, thermoplastic elastomers, rubber, and acrylic.

25. The thermal interface of claim 21, wherein the one or more shims are made of a multilayered or multitiered structure comprising:
at least a first layer or tier comprising a carbon nanotube array comprising vertically aligned carbon nanotubes grown from opposing surfaces of a first planar substrate, and
at least a second layer or tier comprising a carbon nanotube array comprising vertically aligned carbon nanotubes grown from opposing surfaces of a second planar substrate,
wherein the at least first layer or tier and the at least second layer or tier are stacked and the vertically aligned carbon nanotubes of the at least first layer or tier at least partially interdigitate the vertically aligned carbon nanotubes of the at least second layer or tier which are interfacing each other.

26. The thermal interface of claim 21, wherein each of the independent layers of the stepped gasket are planar layers.

27. A device comprising the thermal interface of claim 1.

28. The device of claim 27, wherein the device is selected from the group consisting of personal computers, server computers, memory modules, graphics chips, radar and radio-frequency (RF) devices, disc drives, displays, light-emitting diode (LED) displays, lighting systems, automotive control units, power-electronics, solar cells, batteries, communications equipment, cellular phones, thermoelectric generators, and imaging equipment.

29. The device of claim 27, wherein the device is an aerospace device selected from satellites, space vehicles, or space systems operating under vacuum.

30. A method of fabricating the thermal interface of claim 1, the method comprising the steps of:
(1) providing first and second plates;
(2) providing a stepped gasket;
(3) placing the stepped gasket in between the first and the second plates;
(4) joining the first and the second plates with one or more fasteners;
wherein at least one of the first and/or the second plates exhibits plate deformation, deflection, or curvature when joined by the one or more fasteners;
wherein the stepped gasket comprises a plurality of independent layers and there is at least a first base layer and at least a second layer, stacked on top of and in contact with the first base layer, which has a surface area smaller than the surface area of the first base layer;
wherein the at least second layer of the stepped gasket provides at least one or more contact regions with the at least one of the first and/or the second plates exhibiting plate deformation, deflection, or curvature, as compared to a single layer gasket that is not stepped; and
wherein each of the plurality of independent layers of the stepped gasket is independently made of a material selected from graphite, carbon fiber, silicone, thermoplastic elastomers, rubber, and acrylic; or wherein the first base layer comprises a carbon nanotube array comprising vertically aligned carbon nanotubes grown from opposing surfaces of a first planar substrate and the at least second layer comprises a carbon nanotube array comprising vertically aligned carbon nanotubes grown from opposing surfaces of a second planar substrate and wherein the vertically aligned carbon nanotubes of the first base layer at least partially interdigitate the vertically aligned carbon nanotubes of the second layer which are interfacing each other.

31. The method of claim 30, wherein the one or more fasteners join the first and the second plates through one or more holes present on the first and the second plates.

32. The method of claim 30, wherein the first and second plates are independently made of a material selected from the group consisting of aluminum, copper, steel, titanium, zinc, metal matrix composites, and metal laminate structures; or the first and second plates are independently made of a plastic selected from the group consisting of acrylonitrile butadiene styrene, polycarbonate, nylon, epoxy, glass-reinforced epoxy laminate material (such as FR4), high-pressure fiberglass laminate (such as G10), fiberglass composites, PEEK, polyethylene, polyethylene terephthalate glycol, polypropylene, polyurethane, polyvinyl chloride, polyimide, polytetrafluoroethylene, polylactic acid, PEDOT:PSS (poly(3,4-ethylenedioxythiophene) polystyrene sulfonate), PARA, polyphenylene sulfide, polyamide-imide, and polyetherimide; or the first and second plates are independently made of a ceramic selected from the group consisting of alumina, aluminum nitride, zirconia, zirconia alumina, beryllium oxide, carbon fiber, graphite, silicon carbide, silicon dioxide, silicon nitride, $Y_2O_3$, TiC, $SrAl_2O_3$, ZrC, HfC, TaC, $ZrB_2$, $HfB_2$, $Mo_2B_5$, $MoSi_2$ TiN, YrN, and co-fired ceramics.

33. The method of claim 30, wherein the first and second plates have a square, rectangular, circular, oval, or ring shape; and
    wherein the stepped gasket has the same shape as the first and second plates.

34. The method of claim 30, wherein the first and second plates each independently have a thickness in a range of between about 0.5 mm to about 30 mm.

35. The method of claim 30, wherein the one or more fasteners are threaded fasteners, clamps, clips, push pins, rivets, a pneumatic press, a hydraulic press, or combinations thereof.

36. The method of claim 35, wherein the threaded fasteners are bolts and nuts; or the threaded fasteners are bolts and potted inserts.

37. The method of claim 30, wherein the one or more fasteners are made of a material selected from the group consisting of steel, titanium, aluminum, nylon, brass, bronze, and zinc.

38. The method of claim 30, wherein each of the plurality of layers of the stepped gasket independently has a thickness in a range of between about 50 μm and about 500 μm.

39. The method of claim 30, wherein the material is selected from graphite, carbon fiber, silicone, rubber, and acrylic.

40. The method of claim 30, wherein the method further comprises a step of placing one or more shims between the first and the second plates prior to step (4).

41. The method of claim 40, wherein the one or more shims are made of a metal foil.

42. The method of claim 40, wherein the one or more shims are made of a material selected from graphite, carbon fiber, silicone, thermoplastic elastomers, rubber, and acrylic.

43. The method of claim 40, wherein the one or more shims are made of a multilayered or multitiered structure comprising:
    at least a first layer or tier comprising a carbon nanotube array comprising vertically aligned carbon nanotubes grown from opposing surfaces of a first planar substrate, and
    at least a second layer or tier comprising a carbon nanotube array comprising vertically aligned carbon nanotubes grown from opposing surfaces of a second planar substrate,
    wherein the at least first layer or tier and the at least second layer or tier are stacked and the vertically aligned carbon nanotubes of the at least first layer or tier at least partially interdigitate the vertically aligned carbon nanotubes of the at least second layer or tier which are interfacing each other.

44. The method of claim 40, wherein each of the independent layers of the stepped gasket are planar layers.

* * * * *